US011885953B2

(12) United States Patent
Corbett et al.

(10) Patent No.: US 11,885,953 B2
(45) Date of Patent: Jan. 30, 2024

(54) APPARATUS AND METHOD OF PROVIDING PARAMETER ESTIMATION

(71) Applicant: ILLUMINA, INC., San Diego, CA (US)

(72) Inventors: Austin Corbett, San Diego, CA (US); Bo Lu, San Diego, CA (US); Robert Langlois, San Diego, CA (US); Joseph Pinto, Solana Beach, CA (US); Yu Chen, Irvine, CA (US); Peter Newman, San Diego, CA (US); Hongji Ren, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 120 days.

(21) Appl. No.: 17/558,829

(22) Filed: Dec. 22, 2021

(65) Prior Publication Data

US 2022/0113532 A1    Apr. 14, 2022

Related U.S. Application Data

(63) Continuation of application No. 17/110,406, filed on Dec. 3, 2020, now Pat. No. 11,243,390.

(Continued)

(51) Int. Cl.
*G06K 9/00* (2022.01)
*G02B 21/36* (2006.01)
(Continued)

(52) U.S. Cl.
CPC .......... *G02B 21/365* (2013.01); *G02B 26/06* (2013.01); *G06T 7/0014* (2013.01); *G06T 7/80* (2017.01);
(Continued)

(58) Field of Classification Search
CPC ........... G01N 21/6458; G01N 21/4795; G01N 21/6486; G01N 2021/6421;
(Continued)

(56) References Cited

U.S. PATENT DOCUMENTS 9,350,921 B2    5/2016 Delaney et al.
9,540,690 B2    1/2017 Earney et al.
(Continued)

FOREIGN PATENT DOCUMENTS

WO    WO 2019/147584 A1    8/2019

OTHER PUBLICATIONS

Chang, Chia-Yuan, and Shean-Jen Chen. "Improvement of axial excitation confinement in temporal focusing-based multiphoton microscopy via spatially modulated illumination." *Emerging Digital Micromirror Device Based Systems and Applications IX.* vol. 10117. International Society for Optics and Photonics, 2017.

(Continued)

*Primary Examiner* — Alex Kok S Liew
(74) *Attorney, Agent, or Firm* — FROST BROWN TODD LLP

(57) ABSTRACT

A method is used to generate a report presenting parameter values corresponding to a structured illumination microscopy (SIM) optical system. The parameter values are based at least in part on the performed modulation calculation corresponding to an image set captured with the SIM optical system. A minimum FWHM slice is identified, based at least in part on an average FWHM value across the images in the first image set. Parameter estimation is performed on the identified minimum FWHM slice. Best in-focus parameters are identified based at least in part on the performed estimation. A phase estimate is performed for each image in the set. A modulation calculation is performed based at least in part on the identified best in-focus parameters. The report is (Continued)

based at least in part on the performed modulation calculation.

20 Claims, 17 Drawing Sheets

Related U.S. Application Data

(60) Provisional application No. 62/944,692, filed on Dec. 6, 2019.

(51) Int. Cl.
| | |
|---|---|
| G06T 7/80 | (2017.01) |
| G02B 26/06 | (2006.01) |
| G06T 7/00 | (2017.01) |
| H04N 23/56 | (2023.01) |
| G02B 21/08 | (2006.01) |

(52) U.S. Cl.
CPC .......... *H04N 23/56* (2023.01); *G02B 21/082* (2013.01); *G06T 2207/10056* (2013.01); *G06T 2207/30168* (2013.01)

(58) Field of Classification Search
CPC ....... G01N 2021/6439; G01N 21/6428; G01N 2021/6441; G01N 21/64; G01N 2201/06113; G01N 2201/12; G01N 15/1475; G01N 2021/6419; G01N 21/6456; G01N 33/582; G01N 2201/0633; G01N 15/1429; G01N 21/6408; G01N 2015/1006; G01N 1/30; G01N 15/1436; G01N 2021/6463; G01N 2021/6478; G01N 21/65; G01N 2015/0065; G01N 21/6445; G01N 2015/144

See application file for complete search history.

(56) References Cited

U.S. PATENT DOCUMENTS

| | | |
|---|---|---|
| 9,885,859 B2 | 2/2018 | Harris |
| 10,005,083 B2 | 6/2018 | Earney et al. |
| 10,261,018 B2 | 4/2019 | Earney et al. |
| 11,243,390 B2 | 2/2022 | Corbett et al. |
| 2001/0050758 A1* | 12/2001 | Suzuki .............. G02B 13/16 348/E5.142 |
| 2002/0135780 A1 | 9/2002 | Budach et al. |
| 2006/0007433 A1 | 1/2006 | Ikuta et al. |
| 2006/0043184 A1* | 3/2006 | Fukuchi ............ G03H 1/0841 235/455 |
| 2008/0069467 A1* | 3/2008 | Schafer .............. G02B 21/06 382/254 |
| 2010/0157086 A1* | 6/2010 | Segale .............. G02B 26/10 348/222.1 |
| 2012/0194646 A1 | 8/2012 | Chiang et al. |
| 2013/0314717 A1 | 11/2013 | Yi et al. |
| 2018/0214869 A1 | 8/2018 | Earney et al. |
| 2019/0195799 A1 | 6/2019 | Earney et al. |

OTHER PUBLICATIONS

Demmerle, Justin, et al. "Strategic and practical guidelines for successful structured illumination microscopy." *Nature protocols* 12.5 (2017): 988-1010.

Gustafsson, Mats GL. "Surpassing the lateral resolution limit by a factor of two using structured illumination microscopy." *Journal of microscopy* 198.2 (2000): 82-87.

Gustafsson, Mats GL, et al. "Three-dimensional resolution doubling in wide-field fluorescence microscopy by structured illumination." *Biophysical journal* 94.12 (2008): 4957-4970.

Lal, Amit, Chunyan Shan, and Peng Xi. "Structured illumination microscopy image reconstruction algorithm." *IEEE Journal of Selected Topics in Quantum Electronics* 22.4 (2016): 50-63.

Murray, John M. "Methods for imaging thick specimens: confocal microscopy, deconvolution, and structured illumination." *Cold Spring Harbor Protocols* 2011.12 (2011): pdb-top066936.

Schropp, Martin, Christian Seebacher, and Rainer Uhl. "XL-SIM: Extending superresolution into deeper layers." *Photonics*. vol. 4. No. 2. Multidisciplinary Digital Publishing Institute, 2017.

Wicker, Kai. "Non-iterative determination of pattern phase in structured illumination microscopy using auto-correlations in Fourier space." *Optics express* 21.21 (2013): 24692-24701.

Wicker, Kai, et al. "Phase optimisation for structured illumination microscopy." *Optics express* 21.2 (2013): 2032-2049.

Yeh, Li-Hao, Lei Tian, and Laura Waller. "Structured illumination microscopy with unknown patterns and a statistical prior." *Biomedical optics express* 8.2 (2017): 695-711.

International Search Report and Written Opinion dated Mar. 29, 2021, for International Application No. PCT/US2020/062971, 17 pages.

* cited by examiner

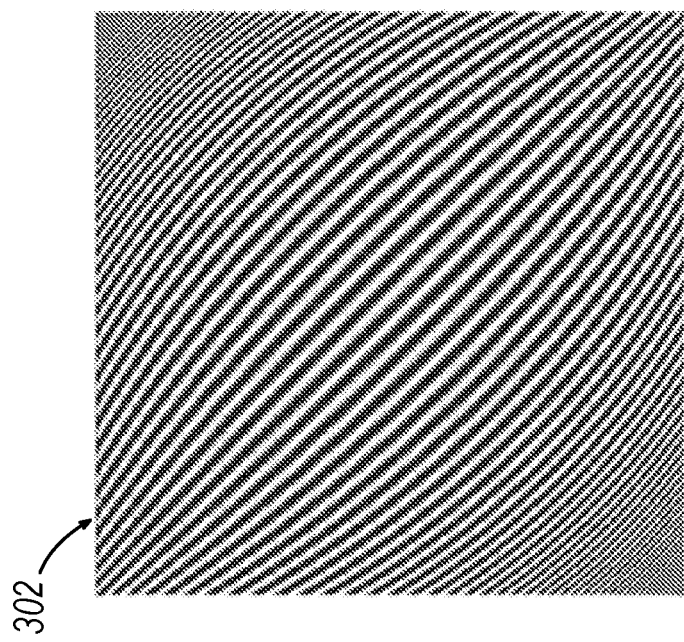
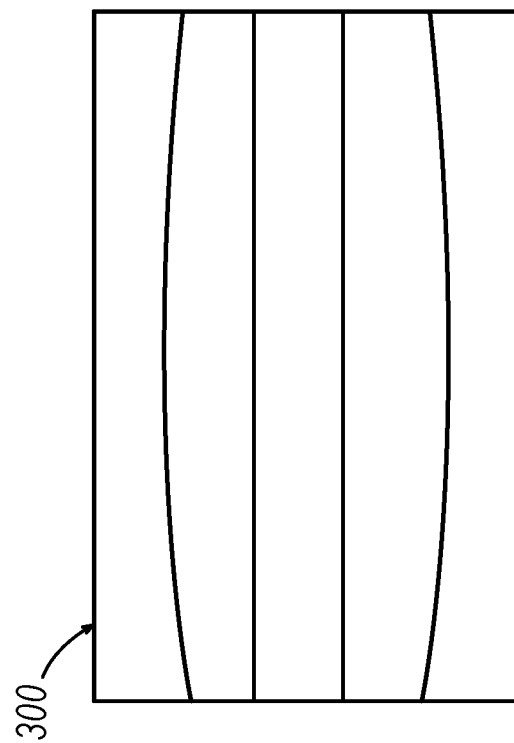
FIG. 6A

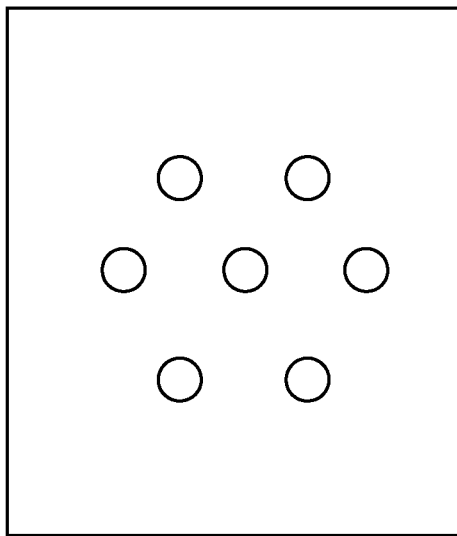
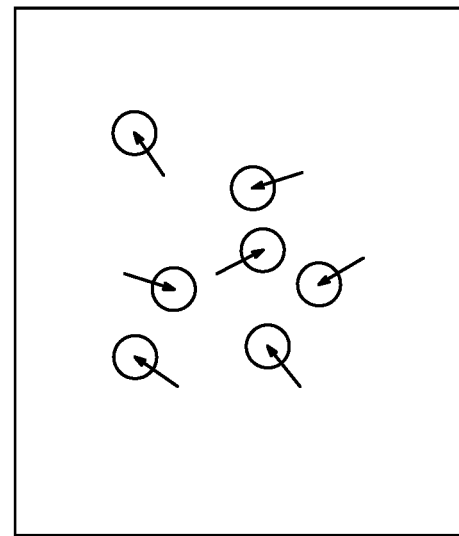
FIG. 9A　　　　　FIG. 9B
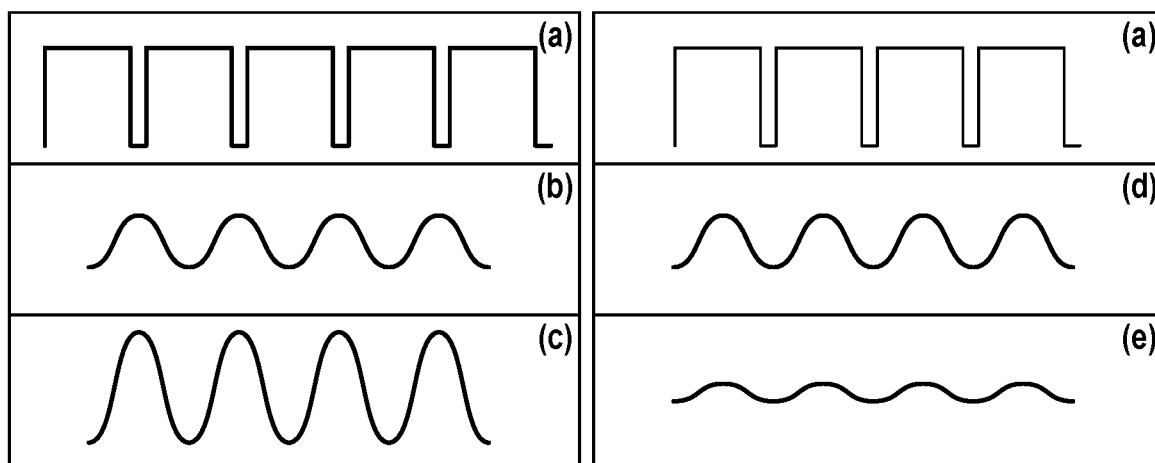
FIG. 10

APPARATUS AND METHOD OF PROVIDING PARAMETER ESTIMATION

RELATED APPLICATIONS

This application is a continuation of U.S. patent application Ser. No. 17/110,406, entitled "Apparatus and Method of Providing Parameter Estimation," filed Dec. 3, 2020, issued Feb. 8, 2022, as U.S. Pat. No. 11,243,390, and which claims priority to U.S. Provisional Pat. App. No. 62/944,692, entitled "Apparatus and Method of Providing Parameter Estimation," filed Dec. 6, 2019, the disclosure of which is incorporated by reference herein, in its entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Structured illumination microscopy (SIM) is a class of computational imaging algorithm that reconstructs super resolution images from multiple lower-resolution source images. To ensure successful reconstruction, the source raw images should be of high quality. High quality raw images require careful tuning, calibration, and assessment of the optics performance of the imaging instrument. In addition to conventional imaging instrument characterization, the SIM imaging optics have additional components that need to be further characterized and validated.

SUMMARY

It may be desirable to provide systems and methods for promoting quality control and calibration with imaging optics and associated optical components within a SIM system, particularly a SIM system that is used for imaging biological samples such as nucleotide sequences. Described herein are devices, systems, and methods for processing images captured using SIM to overcome the pre-existing challenges and achieve the benefits as described herein.

An implementation relates to a method that includes receiving a plurality of image sets, each image set of the plurality of image sets including images captured using structured illumination microscopy (SIM) in an optical system at a distance from a subject that differs from the distance from the subject at which images are captured in the other image sets of the plurality of image sets, each image of the plurality of image sets having an associated channel and an associated grating angle. The method further includes isolating a first image set from the plurality of image sets based at least in part on the distance corresponding to the first image set. The method further includes measuring a full width at half maximum (FWHM) value corresponding to each image in the first image set. The method further includes identifying a minimum FWHM slice based at least in part on an average FWHM value across the images in the first image set. The method further includes performing parameter estimation on the identified minimum FWHM slice corresponding to the first image set. The method further includes identifying best in-focus parameters based at least in part on the performed parameter estimation corresponding to the first image set. The method further includes storing the identified best in-focus parameters based at least in part on the performed parameter estimation corresponding to the first image set. The method further includes performing a phase estimate for each image within the first image set. The method further includes performing a modulation calculation based at least in part on the identified best in-focus parameters corresponding to the first image. The method further includes generating a report presenting parameter values corresponding to the optical system, based at least in part on the performed modulation calculation corresponding to the first image set.

In some implementations of a method, such as that described in the preceding paragraph of this summary, the method further includes isolating a second image set from the plurality of image sets based at least in part on the distance corresponding to the second image set. The method further includes measuring a full width at half maximum (FWHM) value corresponding to each image in the second image set. The method further includes identifying a minimum FWHM slice based at least in part on an average FWHM value across the images in the second image set. The method further includes performing parameter estimation in the identified minimum FWHM slice corresponding to the second image set. The method further includes identifying best in-focus parameters based at least in part on the performed parameter estimation corresponding to the second image set. The method further includes storing the identified best in-focus parameters based at least in part on the performed parameter estimation corresponding to the second image set. The method further includes performing a phase estimate for each image within the second image set. The method further includes performing a modulation calculation based at least in part on the identified best in-focus parameters corresponding to the second image set. The generated report is based at least in part on a combination of the performed modulation calculation corresponding to the first image set and the performed modulation calculation corresponding to the second image set.

In some implementations of a method, such as any of those described in any of the preceding paragraphs of this summary, the measuring the FWHM value corresponding to each image in the first image set is performed on a center estimation window of each image in the first image set.

In some implementations of a method, such as any of those described in any of the preceding paragraphs of this summary, the performing parameter estimation in the identified minimum FWHM slice corresponding to the first image set is performed on a center estimation window of the identified minimum FWHM slice.

In some implementations of a method, such as any of those described in any of the preceding paragraphs of this summary, the stored best in-focus parameters include one or both of grating spacing or grating angle.

In some implementations of a method, such as any of those described in any of the preceding paragraphs of this summary, the performing a phase estimate for each image within the first image set includes performing a Wicker phase estimate.

In some implementations of a method, such as any of those described in any of the preceding paragraphs of this summary, the generated report is in the form of a table.

In some implementations of a method, such as any of those described in any of the preceding paragraphs of this summary, the method further includes comparing parameters in the report against a predefined set of parameter specifications.

In some implementations of a method, such as that described in the preceding paragraph of this summary, the method further includes determining that a parameter in the report deviates from the predefined set of parameter specifications, and adjusting one or more features in the optical system based at least in part on the determination that a parameter in the report deviates from the predefined set of parameter specifications.

In some implementations of a method, such as any of those described in any of the preceding paragraphs of this summary, each image set of the plurality of image sets includes twelve images.

In some implementations of a method, such as any of those described in any of the preceding paragraphs of this summary, each image of the plurality of images has an associated channel selected from a group consisting of a first color channel and a second color channel, such that the plurality of images include images corresponding to the first color channel and images corresponding to the second color channel.

In some implementations of a method, such as that described in the preceding paragraph of this summary, each image set of the plurality of image sets including images corresponding to the first color channel and images corresponding to the second color channel.

In some implementations of a method, such as any of those described in any of the preceding paragraphs of this summary, each image of the plurality of images has an associated grating angle selected from a group consisting of a first grating angle and a second grating angle, such that the plurality of images include images corresponding to the first grating angle and images corresponding to the second grating angle.

In some implementations of a method, such as that described in the preceding paragraph of this summary, each image set of the plurality of image sets includes images corresponding to the first grating angle and images corresponding to the second grating angle.

In some implementations of a method, such as any of those described in any of the preceding two paragraphs of this summary, the method further includes capturing the plurality of images. The method further includes, while capturing the plurality of images, either moving a light source relative to one or more phase masks from a first position to a second position or moving one or more phase masks relative to a light source from a first position to a second position, the first position providing the first grating angle and the second position providing the second grating angle.

In some implementations of a method, such as any of those described in any of the preceding paragraphs of this summary, the measuring a FWHM value corresponding to each image in the first image set is performed using a raw unreconstructed zero-value phase for each grating angle corresponding to each image in the first image set.

In some implementations of a method, such as any of those described in any of the preceding paragraphs of this summary, the generated report including parameter values selected from the group consisting of distances between an objective lens in the optical system and the subject, the channel corresponding to each image of the plurality of images, angle index, modulation, FWHM values, grating spacing, and grating angles.

In some implementations of a method, such as any of those described in any of the preceding paragraphs of this summary, the method further includes capturing the plurality of image sets. The capturing the plurality of image sets includes capturing the first image set while an objective lens of the optical system is positioned at a first distance from the subject. The capturing the plurality of image sets further includes capturing a second image set while the objective lens of the optical system is positioned at a second distance from the subject. The capturing the plurality of image sets further includes capturing a third image set while the objective lens of the optical system is positioned at a third distance from the subject.

In some implementations of a method, such as any of those described in any of the preceding paragraphs of this summary, the modulation calculation includes factors comprising an orientation and periodicity of a fringe pattern corresponding to images in the first image set.

In some implementations of a method, such as any of those described in any of the preceding paragraphs of this summary, the subject includes nucleotides.

In some implementations of a method, such as any of those described in any of the preceding paragraphs of this summary, the method further includes computing phase shift between pairs of images of the first image set, each pair of images of the pairs of images sharing a channel and grating angle.

In some implementations of a method, such as that described in the preceding paragraph of this summary, the generated report includes the computed phase shifts.

In some implementations of a method, such as any of those described in any of the two preceding paragraphs of this summary, the method further includes comparing the computed phase shifts against a predetermined range of phase shifts.

In some implementations of a method, such as that described in the preceding paragraph of this summary, the method further includes determining that at least one of the computed phase shifts is outside the predetermined range of phase shifts. The method further includes, in response to determining that at least one of the computed phase shifts is outside the predetermined range of phase shifts, calculating gain values to correct the phase shifts that are outside the predetermined range of phase shifts.

In some implementations of a method, such as that described in the preceding paragraph of this summary, the method further includes establishing new phase shifting voltages based at least in part on the calculated gain values.

In some implementations of a method, such as that described in the preceding paragraph of this summary, the method further includes applying the new phase shifting voltages to a piezoelectric element, the piezoelectric element to provide phase shifts within the optical system. The method further includes capturing a new image set with the new phase shifting voltages being applied to the piezoelectric element.

In some implementations of a method, such as that described in the preceding paragraph of this summary, the method further includes computing phase shift between pairs of images of the new image set, each pair of images of the pairs of images sharing a channel and grating angle. The method further includes comparing the computed phase shifts of the new images against a predetermined range of phase shifts.

In some implementations of a method, such as that described in the preceding paragraph of this summary, the method further includes determining that at least one of the computed phase shifts of the new images is outside the predetermined range of phase shifts. The method further includes, in response to determining that at least one of the computed phase shifts of the new images is outside the predetermined range of phase shifts, calculating updated gain values to correct the phase shifts of the new images that are outside the predetermined range of phase shifts.

In some implementations of a method, such as that described in the preceding paragraph of this summary, the method further includes establishing additional new phase shifting voltages based at least in part on the calculated updated gain values.

In some implementations, an apparatus includes a first optical assembly to emit structured illumination toward a target. The first optical assembly includes a light emitting assembly, a first phase mask to impart a first pattern to light emitted by the light emitting assembly, a second phase mask to impart a second pattern to light emitted by the light emitting assembly, and a phase adjustment assembly to adjust a phase of light structured by the first phase mask and the second phase mask. The apparatus further includes a second optical assembly. The second optical assembly includes an image sensor to capture images of the target as illuminated by the first optical assembly. The apparatus further includes a processor. The processor is to receive a plurality of image sets, each image set of the plurality of image sets including images captured using the second optical assembly at a distance from a subject that differs from the distance from the subject at which images are captured in the other image sets of the plurality of image sets, each image of the plurality of images having an associated channel and an associated grating angle. The processor is further to isolate a first image set from the plurality of image sets based at least in part on the distance corresponding to the first image set. The processor is further to measure a full width at half maximum (FWHM) value corresponding to each image in the first image set. The processor is further to identify a minimum FWHM slice based at least in part on an average FWHM value across the images in the first image set. The processor is further to perform parameter estimation on the identified minimum FWHM slice corresponding to the first image set. The processor is further to identify best in-focus parameters based at least in part on the performed parameter estimation corresponding to the first image set. The processor is further to store the identified best in-focus parameters based at least in part on the performed parameter estimation corresponding to the first image set. The processor is further to perform a phase estimate for each image within the first image set. The processor is further to perform a modulation calculation based at least in part on the identified best in-focus parameters corresponding to the first image set. The processor is further to generate a report presenting parameter values corresponding to the optical system, based at least in part on the performed modulation calculation corresponding to the first image set.

In some implementations of an apparatus, such as that described in the preceding paragraph of this summary, the target includes a sample container.

In some implementations of an apparatus, such as that described in the preceding paragraph of this summary, the target includes a biological sample in the sample container.

In some implementations of an apparatus, such as any of those described in any of the preceding paragraphs of this summary, the light emitting assembly is to emit light in at least two channels.

In some implementations of an apparatus, such as that described in the preceding paragraph of this summary, the at least two channels include at least two colors, each color of the at least two colors being corresponding to a corresponding channel of the at least two channels.

In some implementations of an apparatus, such as any of those described in any of the preceding paragraphs of this summary, the first optical assembly further includes a grating switcher, the grating switcher to selectively direct or permit light emitted from the light emitting assembly toward the first phase mask or the second phase mask.

In some implementations of an apparatus, such as that described in the preceding paragraph of this summary, the grating switcher includes at least one movable reflective element.

In some implementations of an apparatus, such as that described in the preceding paragraph of this summary, the grating switcher further includes a rotatable plate supporting the movable reflective element, the rotatable plate being rotatable to thereby selectively position the reflective element in relation to the first phase mask or the second phase mask, to thereby selectively direct or permit light emitted from the light emitting assembly toward the first phase mask or the second phase mask.

In some implementations of an apparatus, such as any of those described in any of the preceding paragraphs of this summary, the phase adjustment assembly includes a movable reflecting element.

In some implementations of an apparatus, such as that described in the preceding paragraph of this summary, the phase adjustment assembly further includes an actuator to move the movable reflecting element.

In some implementations of an apparatus, such as that described in the preceding paragraph of this summary, the actuator is to move the movable reflecting element along a linear path.

In some implementations of an apparatus, such as any of those described in any of the preceding two paragraphs of this summary, the actuator includes a piezoelectric element.

In some implementations of an apparatus, such as any of those described in any of the preceding paragraphs of this summary, the processor is further to compute phase shift between pairs of images of the first image set, each pair of images of the pairs of images sharing a channel and grating angle.

In some implementations of an apparatus, such as that described in the preceding paragraph of this summary, the processor is further to compare the computed phase shifts against a predetermined range of phase shifts.

In some implementations of an apparatus, such as that described in the preceding paragraph of this summary, the processor is further to determine that at least one of the computed phase shifts is outside the predetermined range of phase shifts. The processor is further to, in response to determining that at least one of the computed phase shifts is outside the predetermined range of phase shifts, calculate gain values to correct the phase shifts that are outside the predetermined range of phase shifts.

In some implementations of an apparatus, such as that described in the preceding paragraph of this summary, the processor is further to establish new phase shifting voltages based at least in part on the calculated gain values.

In some implementations of an apparatus, such as that described in the preceding paragraph of this summary, the phase adjustment assembly includes a piezoelectric element to adjust the phase of light structured by the first phase mask and the second phase mask, the new phase shifting voltages to activate the piezoelectric element to provide phase shifts that are closer to the predetermined range of values.

In some implementations of an apparatus, such as any of those described in any of the preceding paragraphs of this summary, the apparatus further includes a targeting device including a preformed optical pattern. The targeting device is to enable the first optical assembly to emit structured illumination toward the preformed optical pattern. The targeting device is further to enable the image sensor to capture images of the preformed optical pattern as illuminated by the first optical assembly.

In some implementations of an apparatus, such as that described in the preceding paragraph of this summary, the preformed optical pattern includes an array of dots.

In some implementations of an apparatus, such as that described in the preceding paragraph of this summary, the dots of the array are positioned in a non-ordered arrangement.

In some implementations of an apparatus, such as that described in the preceding paragraph of this summary, the dots of the array are spaced apart from each other by at least a predetermined minimum spacing distance.

In some implementations of an apparatus, such as any of those described in any of the four preceding paragraphs of this summary, the preformed optical pattern includes at least one line pair.

In some implementations of an apparatus, such as that described in the preceding paragraph of this summary, the first pattern of the first phase mask includes a first set of lines. The second pattern of the second phase mask includes a second set of lines. The lines of the at least one line pair are arranged to be off-angle relative to the lines of the first set of lines and relative to the lines of the second set of lines.

In some implementations of an apparatus, such as any of those described in any of the six preceding paragraphs of this summary, the targeting device further includes a fluid filled channel containing a fluid that is to fluoresce in response to light from the first optical assembly.

In some implementations of an apparatus, such as that described in the preceding paragraph of this summary, the fluid filled channel has a depth from approximately 2 μm to approximately 10 μm.

In some implementations of an apparatus, such as any of those described in any of the six preceding paragraphs of this summary, the fluid filled channel has a depth of approximately 3 μm.

In some implementations, a processor-readable medium includes contents that are configured to cause a computing system to process data by performing the method of any one or more of the methods described in any of the preceding paragraphs of this summary.

It should be appreciated that all combinations of the foregoing concepts and additional concepts discussed in greater detail below (provided such concepts are not mutually inconsistent) are contemplated as being part of the inventive subject matter disclosed herein and to achieve the benefits/advantages as described herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

FIG. 6A is a simplified depiction of bending parallel lines due to distortion of a lens that magnifies.

FIG. 9A depicts an optical pattern for a dedicated target device for use in a non-SIM imaging system.

FIG. 9B depicts an optical pattern for a dedicated target device for use in a SIM imaging system.

FIG. 10 depicts graphs showing examples of different light intensities obtainable through constructive and destructive interference in a SIM imaging system.

Figure 1A:
FIG. 1A depicts an example of a Moire fringe formation by using a grating with one-dimensional (1D) modulation.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In some aspects, methods and systems are disclosed herein for promoting quality control and calibration with imaging optics and associated optical components within a SIM system, particularly a SIM system that is used for imaging biological samples such as nucleotide sequences.

In the context of imaging biological samples such as nucleotide sequences, SIM may provide the ability to resolve densely packed samples, from flow cells with fluorescent signals from millions of sample points, thereby reducing reagents needed for processing and increasing image processing throughput. In some cases, SIM may enable resolution of fluorescent samples that are packed more densely than the Abbe diffraction limit for resolving adjoining light sources. The biological samples may be in regularly spaced nanowells on a flow cell or they may be in randomly distributed clusters. Adjacent nanowells may be positioned closer together than the Abbe diffraction limit of the associated optical system. While the present example relates to biological samples on nanowells of a flow cell, the teachings herein may be applied to biological samples in various other arrangements; and in other kinds of systems that employ SIM. The teachings herein are thus not necessarily limited to imaging of biological samples.

I. Introduction

Structured illumination may produce images that have several times as many resolved illumination sources as with normal illumination. Multiple images with varying angles and phase displacements of structured illumination are used to transform closely spaced, otherwise unresolvable high spatial frequency features, into lower frequency signals that may be sensed by an optical system without violating the Abbe diffraction limit. This limit is physically imposed on imaging by the nature of light and optics and is expressed as a function of emission wavelength and the numerical aperture (NA) of the final objective lens. Applying SIM reconstruction, information from multiple images is transformed from the spatial domain into the Fourier domain, combined and processed, then reconstructed into an enhanced image. The set of lower-resolution source images that are processed in a SIM system and method may be defined as a "SIM stack." The images in each SIM stack may be acquired with an objective lens that is located at a corresponding z-position or distance relative to the imaged subject matter. Several SIM stacks may be acquired of the same subject matter, with each SIM stack having a z-position that differs from the z-position of the other SIM stacks of the same subject matter.

In SIM, a grating is used, or an interference pattern is generated, between the illumination source and the sample, to generate an illumination pattern, such as a pattern that varies in intensity according to a sine or cosine function. In the SIM context, "grating" is sometimes used to refer to the projected structured illumination pattern, in addition to the surface that produces the structured illumination pattern. The structured illumination pattern alternatively may be generated as an interference pattern between parts of a split coherent beam.

Projection of structured illumination onto a sample plane, for example as shown in FIG. 1, mixes the illumination pattern with fluorescent (or reflective) sources in a sample to induce a new signal, sometimes called a Moire fringe or aliasing. The new signal shifts high-spatial frequency information to a lower spatial frequency that may be captured without violating the Abbe diffraction limit.

Figure 1B:
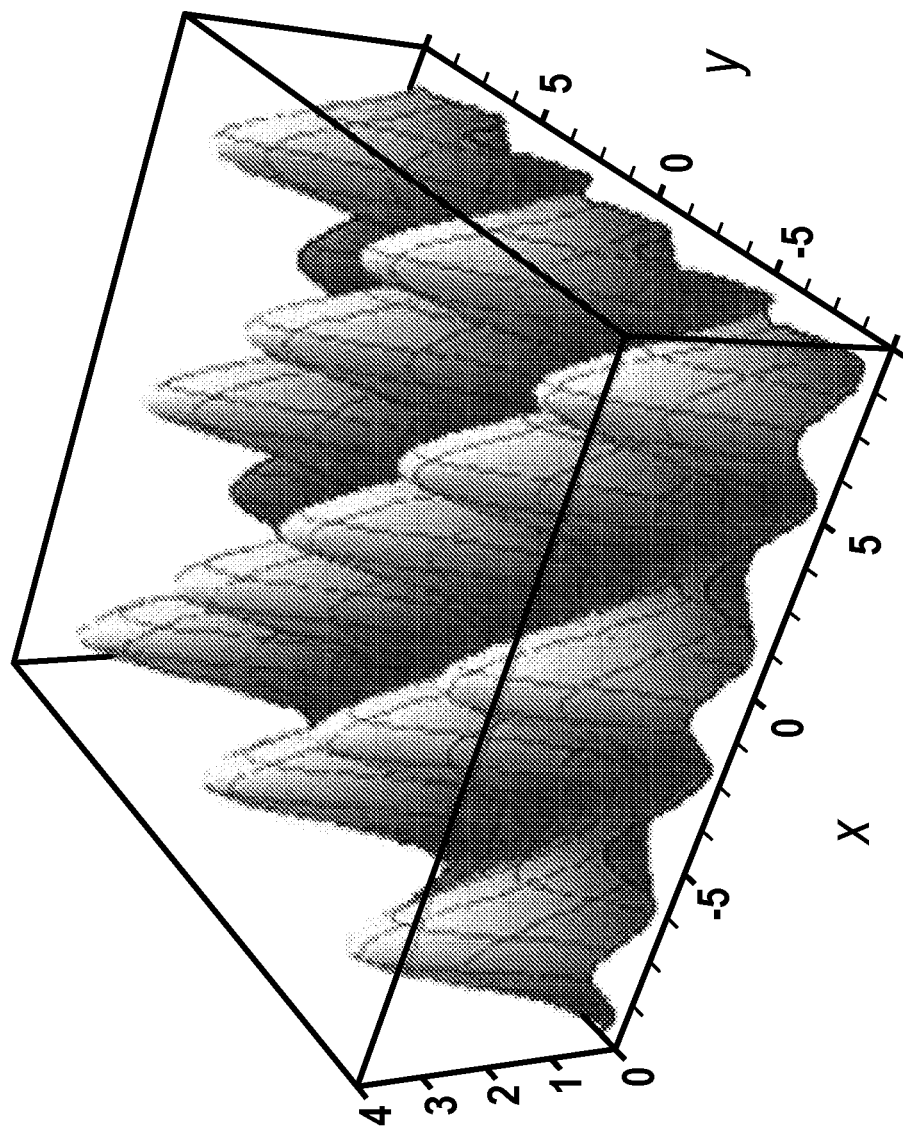
FIG. 1B depicts a graphical illustration of illumination intensities produced by a two-dimensional (2D) structured illumination pattern.

After capturing images of a sample illuminated with a 1D intensity modulation pattern, as shown in FIG. 1A, or 2D intensity modulation pattern, as shown in FIG. 1B, a linear system of equations is solved and used to extract, from multiple images of the Moire fringe or aliasing, parts of the new signal that contains information shifted from the higher to the lower spatial frequency.

To solve the linear equations, several images are captured with the structured illumination pattern shifted or displaced in steps. Images of varying phases per angle may be captured for analysis and then separated by bands for Fourier domain shifting and recombination. Increasing the number of images may improve the quality of reconstructed images by boosting the signal-to-noise ratio. However, it may also increase computation time. The Fourier representation of the band separated images is shifted and summed to produce a reconstructed sum. Eventually, an inverse Fast Fourier Transform (FFT) reconstructs a new high-resolution image from the reconstructed sum.

The standard algorithms for 1D modulated illumination may involve modification when used with a 2D modulated illumination pattern. This may include illumination peak spacing and illumination peak angle estimation, which may involve a 2D band separation. The modification may also include Wicker phase estimation, which work from two points (instead of one) in order to estimate the phase in two dimensions. A 1D interference pattern may be generated by one dimensional diffraction grating as shown in FIG. 1A or as a result of an interference pattern of two beams. In some instances, during imaging of the sample, three images of fringe patterns of the sample are acquired at various pattern phases (e.g., 0°, 120°, and 240°), so that each location on the sample is exposed to a range of illumination intensities, with the procedure repeated by rotating the pattern orientation about the optical axis to 2 (e.g., 45°, 135°) or 3 (e.g., 0°, 60° and 120°) separate angles.

FIG. 1B illustrates an intensity distribution that may be produced by a 2D diffraction grating or by interference of two pairs of coherent light beams. In particular, a 2D structured illumination may be formed by two orthogonal 1D diffraction gratings superimposed upon one another. As in the case of 1D structured illumination patterns, the 2D illumination patterns may be generated either by use of 2D diffraction gratings or by interference between two pairs of coherent light beams that creates a regularly repeating fringe pattern. Two light beams produce an intensity pattern (horizontal bright and dark lines) along y-axis and are therefore referred to as the y-pair of incident beams. Two more light beams produce an intensity pattern (vertical bright and dark lines) along x-axis and are referred to as the x-pair of incident beams. The interference of the y-pair with the x-pair of light beams produces a 2D illumination pattern. FIG. 1B shows intensity distribution of such a 2D illumination pattern.

Figure 1C:
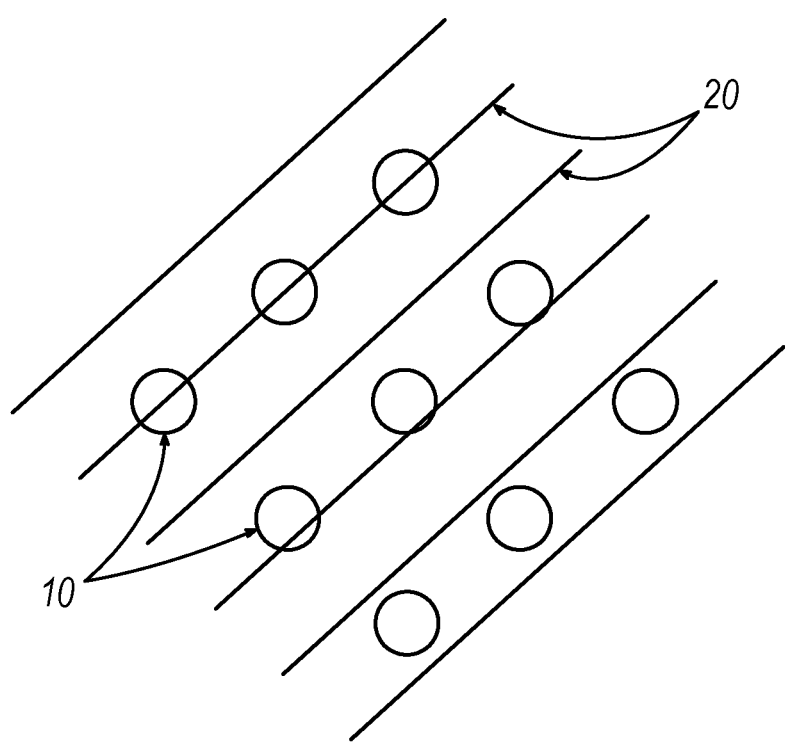
FIG. 1C depicts an example of a geometrical pattern for a nanowell arrangement.

FIG. 1C illustrates an arrangement of nanowells 10 at the surface of a flow cell positioned at corners of a rectangle. FIG. 1C also shows lines 20 of a structured illumination fringe pattern projected onto nanowells 10. In the example shown, lines 20 are slightly angularly offset relative to the alignment of nanowells 10, such that lines 20 are neither perfectly aligned with (or parallel to) the rows of nanowells 10 or the columns of nanowells 10. Alternatively, lines 20 may have any other suitable spatial relationship with the alignment of columns or rows of nanowells 10; or with other spatial arrangements of nanowells 10. When using 1D structured illumination, the illumination peak angle is selected such that images are taken along a line connecting diagonally opposed corners of the rectangle. For example, two sets of three images (a total of six images) may be taken at +45 degree and −45-degree angles. As the distance along the diagonal is more than the distance between any two sides of the rectangle, a higher resolution image is achieved. Nanowells 10 may be arranged in other geometric arrangements such as a hexagon. Three or more images may then be taken along each of three diagonals of the hexagon, resulting, for instance, in nine or fifteen images.

II. Terminology

As used herein to refer to a structured illumination parameter, the term "frequency" is intended to refer to an inverse of spacing between fringes or lines of a structured illumination pattern (e.g., fringe or grid pattern), as frequency and period are inversely related. For example, a pattern having a greater spacing between fringes will have a lower frequency than a pattern having a lower spacing between fringes.

As used herein to refer to a structured illumination parameter, the term "phase" is intended to refer to a phase of a structured illumination pattern illuminating a sample. For example, a phase may be changed by translating a structured illumination pattern relative to an illuminated sample.

As used herein to refer to a structured illumination parameter, the term "orientation" is intended to refer to a relative orientation between a structured illumination pattern (e.g., fringe or grid pattern) and a sample illuminated by the pattern. For example, an orientation may be changed by rotating a structured illumination pattern relative to an illuminated sample.

As used herein to refer to a structured illumination parameter, the terms "predict" or "predicting" are intended to mean either (i) calculating the value(s) of the parameter without directly measuring the parameter or (ii) estimating the parameter from a captured image corresponding to the parameter. For example, a phase of a structured illumination pattern may be predicted at a time t1 by interpolation between phase values directly measured or estimated (e.g., from captured phase images) at times t2 and t3 where t2<t1<t3. As another example, a frequency of a structured illumination pattern may be predicted at a time t1 by extrapolation from frequency values directly measured or estimated (e.g., from captured phase images) at times t2 and t3 where t2<t3<t1.

As used herein to refer to light diffracted by a diffraction grating, the term "order" or "order number" is intended to mean the number of integer wavelengths that represents the path length difference of light from adjacent slits or structures of the diffraction grating for constructive interference. The interaction of an incident light beam on a repeating series of grating structures or other beam splitting structures may redirect or diffract portions of the light beam into predictable angular directions from the original beam. The term "zeroth order" or "zeroth order maximum" is intended to refer to the central bright fringe emitted by a diffraction grating in which there is no diffraction. The term "first-order" is intended to refer to the two bright fringes diffracted to either side of the zeroth order fringe, where the path length difference is ±1 wavelengths. Higher orders are diffracted into larger angles from the original beam. The properties of the grating may be manipulated to control how much of the beam intensity is directed into various orders. For example, a phase grating may be fabricated to maximize the transmission of the non-zeroth orders and minimize the transmission of the zeroth order beam.

As used herein, the term "optical transfer function" or, in its abbreviated form "OTF," is intended to mean the complex valued transfer function describing an imaging system's response as a function of the spatial frequency. The OTF may be derived from the Fourier transform of the point spread function. In examples described herein, only the amplitude portion of the OTF is important. The amplitude portion of the OTF may be referred to as the "modulation transfer function" or, in its abbreviated form, the "MTF."

As used herein to refer to a sample, the term "feature" is intended to mean a point or area in a pattern that may be distinguished from other points or areas according to relative location. An individual feature may include one or more molecules of a particular type. For example, a feature may include a single target nucleic acid molecule having a particular sequence or a feature may include several nucleic acid molecules having the same sequence (and/or complementary sequence, thereof).

As used herein, the term "xy plane" is intended to mean a 2-dimensional area defined by straight line axes x and y in a Cartesian coordinate system. When used in reference to a detector and an object observed by the detector, the area may be further specified as being orthogonal to the beam axis, or the direction of observation between the detector and object being detected.

As used herein, the term "z coordinate" is intended to mean information that specifies the location of a point, line or area along an axis that is orthogonal to an xy plane in a Cartesian coordinate system. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially," "about," and "approximately" used throughout this Specification are used to describe and account for small fluctuations, such as due to variations in processing. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "based on" should be understood to mean that something is determined at least in part by the thing it is indicated as being "based on." To indicate that something must necessarily be completely determined by something else, it is described as being based exclusively on whatever it is completely determined by.

As used herein, the term "nucleotide sequence" or "polynucleotide sequence" should be read to include a polynucleotide molecule, as well as the underlying sequence of the molecule, depending on context. A sequence of a polynucleotide may contain (or encode) information indicative of certain physical characteristics.

III. Examples of Imaging System Components and Arrangements

In some implementations of SIM systems, a linearly polarized light beam is directed through an optical beam splitter that splits the beam into two or more separate orders that may be combined and projected on the imaged sample as an interference fringe pattern with a sinusoidal intensity variation. The split beams are equivalent in power in order to achieve maximum modulation at the sample plane. Diffraction gratings are examples of beam splitters that may generate beams with a high degree of coherence and stable propagation angles. When two such beams are combined, the interference between them may create a uniform, regularly-repeating fringe pattern where the spacing is determined by factors including the angle between the interfering beams. The relationship between the fringe periodicity (FP), the incidence angle (θ) and the wavelength of light (λ) may be expressed in the following equation (I):

$$FP=\lambda \div 2 \sin(\theta), \quad (I)$$

where the fringe period (FP) and the wavelength of light (λ) are in the same units (e.g., nm) and θ is the incidence angle with respect to the surface normal expressed in radians.

FIGS. 2-4B illustrate examples of different forms that SIM imaging systems may take. It should be noted that while these systems are described primarily in the context of SIM imaging systems that generate 1D illumination patterns, the technology disclosed herein may be implemented with SIM imaging systems that generate higher dimensional illumination patterns (e.g., two-dimensional grid patterns).

Figure 2:
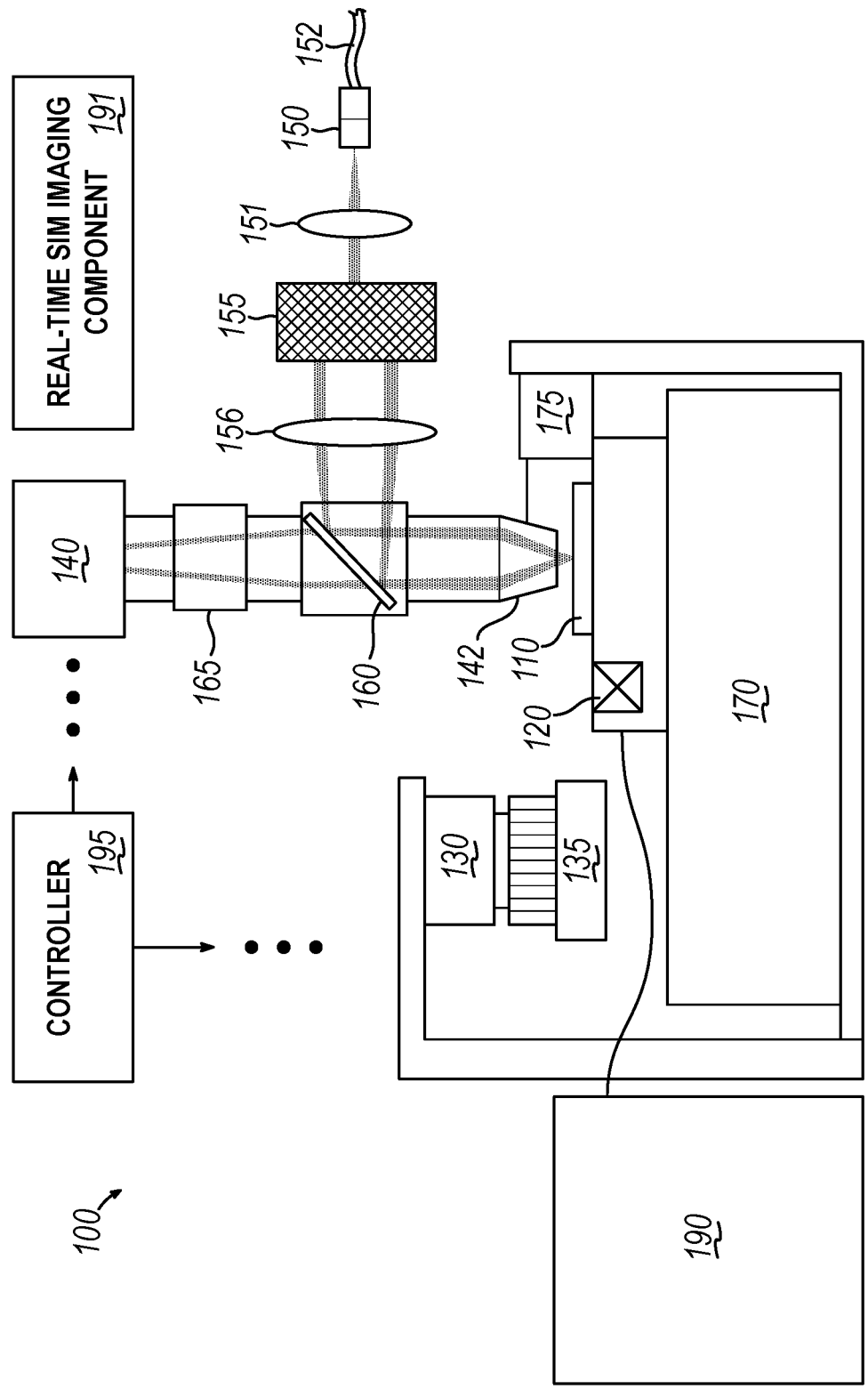
FIG. 2 depicts a schematic diagram of a SIM biological sample imaging system that may utilize spatially structured excitation light to image a sample.

FIG. 2 illustrates a SIM imaging system 100 that may implement structured illumination parameter prediction in accordance with some implementations described herein. For example, system 100 may be a structured illumination fluorescence microscopy system that utilizes spatially structured excitation light to image a biological sample.

In the example of FIG. 2, a light emitter 150 is configured to output a light beam that is collimated by collimation lens 151. The collimated light is structured (patterned) by light structuring optical assembly 155 and directed by dichroic mirror 160 through objective lens 142 onto a sample of a sample container 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence.

Light structuring optical assembly 155 includes one or more optical diffraction gratings or other beam splitting elements (e.g., a beam splitter cube or plate) to generate a pattern of light (e.g., fringes, typically sinusoidal) that is projected onto samples of a sample container 110. The diffraction gratings may be one-dimensional or two-dimensional transmissive or reflective gratings. The diffraction gratings may be sinusoidal amplitude gratings or sinusoidal phase gratings. In some versions, light structuring optical assembly 155 includes a pair of phase masks, where each phase mask includes a piece of glass with graduations etched into the glass.

In some implementations, the diffraction grating(s)s may not utilize a rotation stage to change an orientation of a structured illumination pattern. In other implementations, the diffraction grating(s) may be mounted on a rotation stage. In some implementations, the diffraction gratings may be fixed during operation of the imaging system (i.e., not require rotational or linear motion). For example, in a particular implementation, further described below, the diffraction gratings may include two fixed one-dimensional transmissive diffraction gratings oriented perpendicular to each other (e.g., a horizontal diffraction grating and vertical diffraction grating).

As illustrated in the example of FIG. 2, light structuring optical assembly 155 outputs the first orders of the diffracted light beams while blocking or minimizing all other orders, including the zeroth orders. However, in alternative implementations, additional orders of light may be projected onto the sample.

During each imaging cycle, imaging system 100 utilizes light structuring optical assembly 155 to acquire a plurality of images at various phases, with the fringe pattern displaced laterally in the modulation direction (e.g., in the x-y plane and perpendicular to the fringes), with this procedure repeated one or more times by rotating the pattern orientation about the optical axis (i.e., with respect to the x-y plane of the sample). The captured images may then be computationally reconstructed to generate a higher resolution image (e.g., an image having about twice the lateral spatial resolution of individual images).

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included. For example, multiple light emitters may be included in the case of a structured illumination imaging system that utilizes multiple arms, further discussed below.

In some implementations, system 100 may include a projection lens 156 that may include a lens element to articulate along the z-axis to adjust the structured beam shape and path. For example, a component of the projection lens 156 may be articulated to account for a range of sample thicknesses (e.g., different cover glass thickness) of the sample in container 110.

In the example of system 100, fluid delivery module or device 190 may direct the flow of reagents (e.g., fluorescently labeled nucleotides, buffers, enzymes, cleavage reagents, etc.) to (and through) sample container 110 and waste valve 120. Sample container 110 may include one or more substrates upon which the samples are provided. For example, in the case of a system to analyze a large number of different nucleic acid sequences, sample container 110 may include one or more substrates on which nucleic acids to be sequenced are bound, attached or associated. The substrate may include any inert substrate or matrix to which nucleic acids may be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110. System 100 may also include a temperature station actuator 130 and heater/cooler 135 that may optionally regulate the temperature of conditions of the fluids within the sample container 110.

In particular implementations, the sample container 110 may be implemented as a patterned flow cell including a transparent cover plate, a substrate, and a liquid contained therebetween, and a biological sample may be located at an inside surface of the transparent cover plate or an inside surface of the substrate. The flow cell may include a large number (e.g., thousands, millions, or billions) of wells (also referred to as nanowells) or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters.

Sample container 110 may be mounted on a sample stage 170 to provide movement and alignment of the sample container 110 relative to the objective lens 142. The sample stage may have one or more actuators to allow it to move in any of three dimensions. For example, in terms of the Cartesian coordinate system, actuators may be provided to allow the stage to move in the x, y, and z directions relative to the objective lens. This may allow one or more sample locations on sample container 110 to be positioned in optical alignment with objective lens 142. Movement of sample stage 170 relative to objective lens 142 may be achieved by moving the sample stage itself, the objective lens, some other component of the imaging system, or any combination of the foregoing. Further implementations may also include moving the entire imaging system over a stationary sample. Alternatively, sample container 110 may be fixed during imaging.

In some implementations, a focus (z-axis) component 175 may be included to control positioning of the optical components relative to the sample container 110 in the focus direction (typically referred to as the z axis, or z direction). Focus component 175 may include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators may be configured to move the stage in the z-direction while maintaining the sample stage in the same plane (e.g., maintaining a level or horizontal attitude, perpendicular to the optical axis). The one or more actuators may also be configured to tilt the stage. This may be done, for example, so that sample container 110 may be leveled dynamically to account for any slope in its surfaces.

The structured light emanating from a test sample at a sample location being imaged may be directed through dichroic mirror 160 to one or more detectors of camera system 140. In some implementations, a filter switching assembly 165 with one or more emission filters may be included, where the one or more emission filters may be used to pass through particular emission wavelengths and block (or reflect) other emission wavelengths. For example, the one or more emission filters may be used to switch between different channels of the imaging system. In a particular implementation, the emission filters may be implemented as dichroic mirrors that direct emission light of different wavelengths to different image sensors of camera system 140.

Camera system 140 may include one or more image sensors to monitor and track the imaging (e.g., sequencing) of sample container 110. Camera system 140 may be implemented, for example, as a charge-coupled device (CCD) image sensor camera, but other image sensor technologies (e.g., active pixel sensor) may be used. While camera system 140 and associated optical components are shown as being positioned above sample container 110 in FIG. 2, one or more image sensors or other camera components may be incorporated into system 100 in numerous other ways as will be apparent to those skilled in the art in view of the teachings herein. For instance, one or more image sensors may be positioned under sample container 110 or may even be integrated into sample container 110.

Output data (e.g., images) from camera system 140 may be communicated to a real-time SIM imaging component 191 that may be implemented as a software application that, as further described below, may reconstruct the images captured during each imaging cycle to create an image having a higher spatial resolution. The reconstructed images may take into account changes in structure illumination parameters that are predicted over time. In addition, SIM imaging component 191 may be used to track predicted SIM parameters and/or make predictions of SIM parameters given prior estimated and/or predicted SIM parameters.

A controller 195 may be provided to control the operation of structured illumination imaging system 100, including synchronizing the various optical components of system 100. The controller may be implemented to control aspects of system operation such as, for example, configuration of light structuring optical assembly 155 (e.g., selection and/or linear translation of diffraction gratings), movement of projection lens 156, activation of focus component 175, stage movement, and imaging operations. The controller may be also be implemented to control hardware elements of the system 100 to correct for changes in structured illumination parameters over time. For example, the controller may be configured to transmit control signals to motors or other devices controlling a configuration of light structuring optical assembly 155, motion stage 170, or some other element of system 100 to correct or compensate for changes in structured illumination phase, frequency, and/or orientation over time. In implementations, these signals may be transmitted in accordance with structured illumination parameters predicted using SIM imaging component 191. In some implementations, controller 195 may include a memory for storing predicted and or estimated structured illumination parameters corresponding to different times and/or sample positions.

In various implementations, the controller 195 may be implemented using hardware, algorithms (e.g., machine executable instructions), or a combination of the foregoing. For example, in some implementations the controller may include one or more CPUs, GPUs, or processors with associated memory. As another example, the controller may comprise hardware or other circuitry to control the operation, such as a computer processor and a non-transitory computer readable medium with machine-readable instructions stored thereon. For example, this circuitry may include one or more of the following: field programmable gate array (FPGA), application specific integrated circuit (ASIC), programmable logic device (PLD), complex programmable logic device (CPLD), a programmable logic array (PLA), programmable array logic (PAL) and other similar processing device or circuitry. As yet another example, the controller may comprise a combination of this circuitry with one or more processors.

Figure 3:
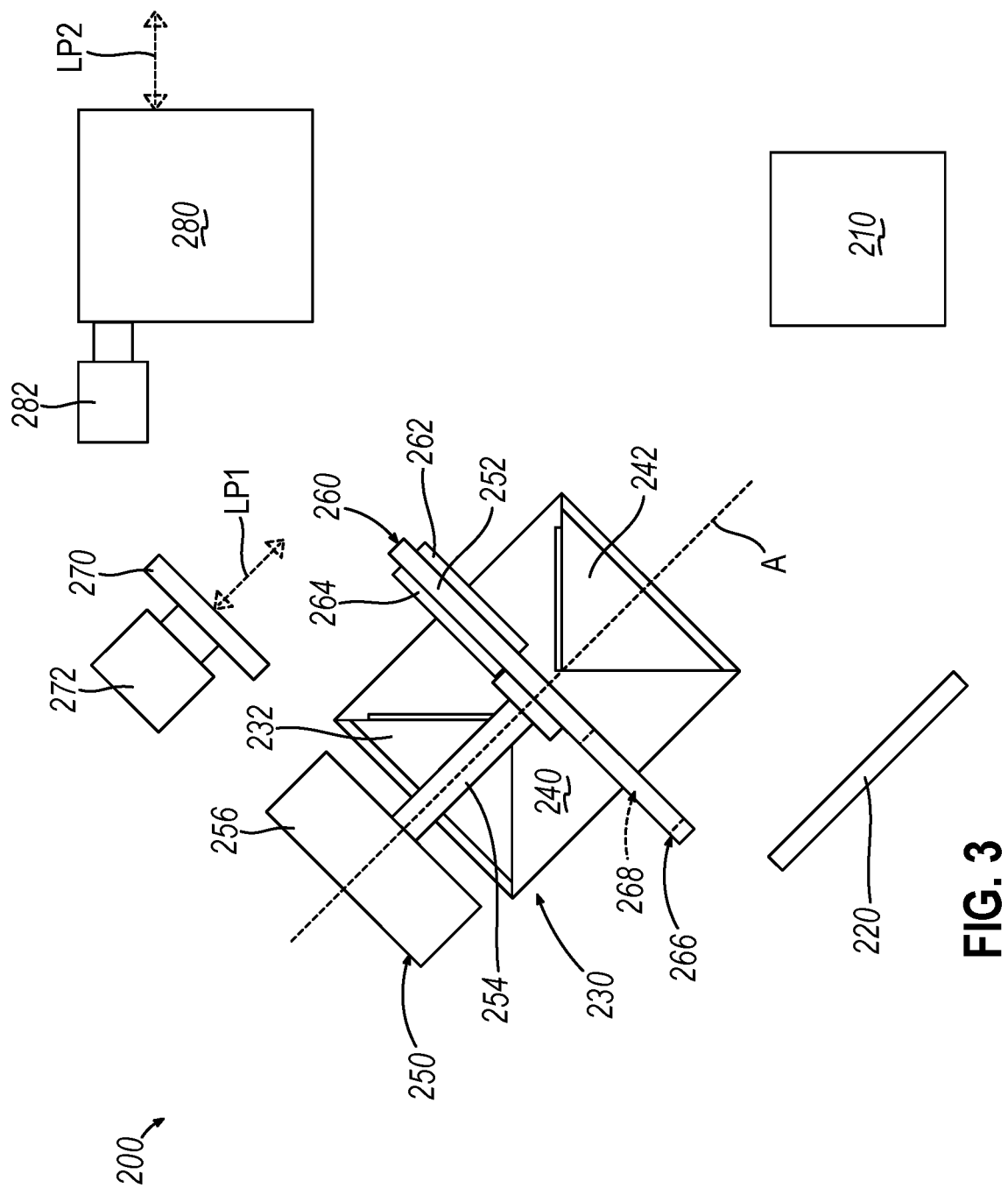
FIG. 3 depicts a schematic diagram of an example of an alternative optical assembly for use in the SIM biological sample imaging system of FIG. 2.

FIG. 3 shows an example of an alternative optical assembly 200 that may be incorporated into system (e.g., in place of optical assembly 155). Optical assembly 200 of this example includes a light emitting assembly 210, a fixed reflecting element 220, a phase mask assembly 230, a grating switcher 250, an adjustable reflecting element 270, and a projection lens assembly 280. Light emitting assembly 210 may include various components, including but not limited to a source of coherent light (e.g., at least one laser, etc.) and a pair of anamorphic prisms, a source of incoherent light and a collimator, or any other suitable components as will be apparent to those skilled in the art in view of the teachings herein. In some versions light emitting assembly 210 is operable to emit light via two or more separate channels (e.g., a blue channel and a green channel). In versions where light is emitted in two or more separate channels, system 100 may include two or more corresponding image sensors, such that each image sensor is dedicated to a corresponding image sensor. Also, in some versions, light emitting assembly 210 is operable to emit light in pulses at a predetermined frequency (e.g., using a high-speed shutter, etc.).

Reflecting element 220 of the present example includes a mirror whose position is fixed relative to the other components of optical assembly 200. As described in greater detail below, reflecting element 220 is positioned and configured to reflect light emitted from light emitting assembly 210 toward phase mask assembly 230 and grating switcher 250 during operation of optical assembly 200.

Figure 4:
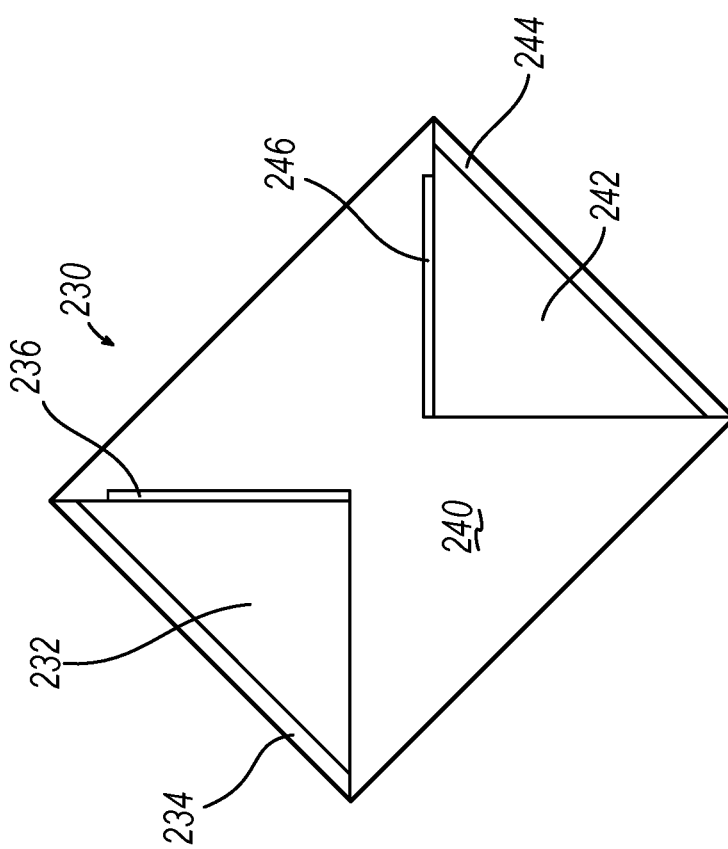
FIG. 4 depicts a schematic diagram of a phase mask assembly of the optical assembly of FIG. 3.

As best seen in FIG. 4, phase mask assembly 230 of the present example includes a pair of triangular glass elements 232, 242 fixedly mounted to a base 240. Each glass element 232, 242 includes a reflector 234, 244 along one side of the glass element 232, 242. Each glass element 232, 242 also includes a phase mask 236, 246 along another side of the glass element 232, 242. In the present example, each phase mask 236, 246 includes graduations (e.g., parallel slits or grooves, etc.) forming a grating or fringe pattern etched into the glass of glass element 232, 242. The graduation spacing may be chosen to diffract light at suitable angles and tuned to the minimum resolvable feature size of the imaged samples for operation of system 100. As will be described in greater detail below, these phase masks 236, 246 are configured to produce Moire fringe or aliasing during operation of optical assembly 200. While phase masks 236, 246 are formed by etched graduations in the glass of glass elements 232, 242 in the present example, other suitable ways in which phase masks 236, 246 may be formed will be apparent to those skilled in the art in view of the teachings herein. During operation of optical assembly 200, the entire phase mask assembly 230 remains stationary relative to the other components of optical assembly 200.

To improve efficiency of the system, the zeroth order beams and all other higher order diffraction beams output by each phase mask 236, 246 may be blocked (i.e., filtered out of the illumination pattern projected on the sample 110). For example, a beam blocking element (not shown) such as an order filter may be inserted into the optical after path phase mask assembly 230. In some implementations, diffraction gratings phase masks 236, 246 may configured to diffract the beams into only the first orders and the zeroth order (undiffracted beam) may be blocked by some beam blocking element.

As shown in FIG. 3, grating switcher 250 of the present example includes a plate 252 mounted to a shaft 254. Shaft 254 is further coupled with a motor 256 that is operable to rotate shaft 254 and plate 252 about an axis A. One end 260 of plate 252 includes a pair of mirrors 262, 264 with each mirror 262, 264 being mounted to an opposite side of plate 252. The other end 266 of plate 252 defines an opening 268 that allows light to pass through as described below. In some versions, motor 256 is a stepper motor. Alternatively, motor 256 may take any other suitable form; and motor 256 may be substituted with any other suitable source of rotary motion. As shown in FIGS. 5A-5D and as will be described in greater detail below, motor 256 may be activated to transition grating switcher 250 between a first state (FIGS. 5A-5B) and a second state (FIGS. 5C-5D) by rotating shaft 254 and plate 252 about the axis A. When grating switcher 250 is in the first state, grating switcher 250 and phase mask assembly 230 may provide a first grating angle. When grating switcher 250 is in the second state, grating switcher 250 and phase mask assembly 230 may provide a second grating angle.

As also shown in FIG. 3, adjustable reflecting element 270 of the present example includes a mirror that is coupled with an actuator 272, such that the actuator 272 is operable to drive reflecting element 270 along a linear path LP1. In this example, linear path LP1 is parallel with axis A. In some versions, actuator 272 includes a piezoelectric element. As another example, actuator 272 may include a solenoid. In some other versions, actuator 272 includes a stepper motor or other rotary drive source that is coupled with a mechanical assembly (e.g., rack and pinion or worm gear and nut, etc.) that is operable to convert rotary motion into linear motion. As described in greater detail below, with actuator 272 changing the position of reflecting element 270 along linear path LP1, actuator 272 and reflecting element 270 are together operable to provide phase modulation to light that is transmitted through optical assembly 200. In other words, actuator 272 and reflecting element 270 may together provide a phase adjustment assembly.

By way of example, actuator 272 may be operable to drive reflecting element 270 through a range of motion of approximately 5 μm during operation of actuator 272, which may provide fringe movement of approximately 240 degrees, as described in greater detail below. Alternatively, actuator 272 may be operable to drive reflecting element 270 through a range of motion ranging from approximately 2 μm to approximately 10 μm during operation of actuator 272. As described in greater detail below, actuator 272 may be driven to arrest motion of reflecting element at two, three, or more different positions through the range of motion along the linear path.

Projection lens assembly 280 may include one or more lens elements (e.g., a tube lens) and various other components as will be apparent to those skilled in the art in view of the teachings herein. Light passed through projection lens assembly 280 may eventually reach sample container 110 (e.g., a flow cell, etc.). In some instances, this may cause biological material in the sample container 110 to fluoresce, with such fluorescence being picked up by an image sensor (e.g., an image sensor of camera system 140) to enable analysis of the biological material. Projection lens assembly 280 of the present example is coupled with an actuator 282, which is operable to drive at least a portion of projection lens assembly 280 along a linear path LP2. In some versions, actuator 282 includes a piezoelectric element. As another example, actuator 282 may include a solenoid. In some other versions, actuator 282 includes a stepper motor or other rotary drive source that is coupled with a mechanical assembly (e.g., rack and pinion or worm gear and nut, etc.) that is operable to convert rotary motion into linear motion. As described in greater detail below, with actuator 282 changing the position of at least a portion of projection lens assembly 280 along linear path LP2, actuator 282 and projection lens assembly 280 are together operable to provide adjustment of the SIM grating focal plane.

As noted above, system 100 of the present example includes a controller 195. Controller 195 may be used to control the operation of optical assembly 200 and other features of system 100, including synchronizing the various components of optical assembly 200 and system 100. The controller 195 may be implemented to control aspects of system operation such as, for example, activation of motor 256, activation of actuator 272, movement of one or more elements of projection lens assembly 280 via actuator 282, activation of focus component 175, activation of camera system 140, and other imaging operations. The controller may be also be implemented to control hardware elements of the system 100 to correct for changes in structured illumination parameters over time. For example, the controller may be configured to transmit control signals to devices (e.g., motor 256, actuator 272, etc.) to correct or compensate for changes in structured illumination phase, frequency, and/or orientation over time. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

FIGS. 5A-5D show optical assembly 200 at various stages of operation. At the stage shown in FIG. 5A, light emitting assembly 210 emits light toward reflecting element 220, which reflects the light toward phase mask assembly 230 and grating switcher 250. At this stage, grating switcher 250 is in a first state such that the light reflected from reflecting element 220 is further reflected by mirror 262. The light reflected by mirror 262 passes through glass element 242 and reaches reflector 244, which reflects the light toward phase mask 246. As the light passes through phase mask 246, phase mask 246 provides a patterned form to the light. This patterned or structured light then passes through opening 268 of plate 252 and reaches reflecting element 270, which then reflects the structured light toward projection lens assembly 280. After passing through projection lens assembly 280, the structured light reaches the object targeted for imaging (e.g., the sample container 110); and camera system 140 captures a first image of the targeted object.

Figure 5A:
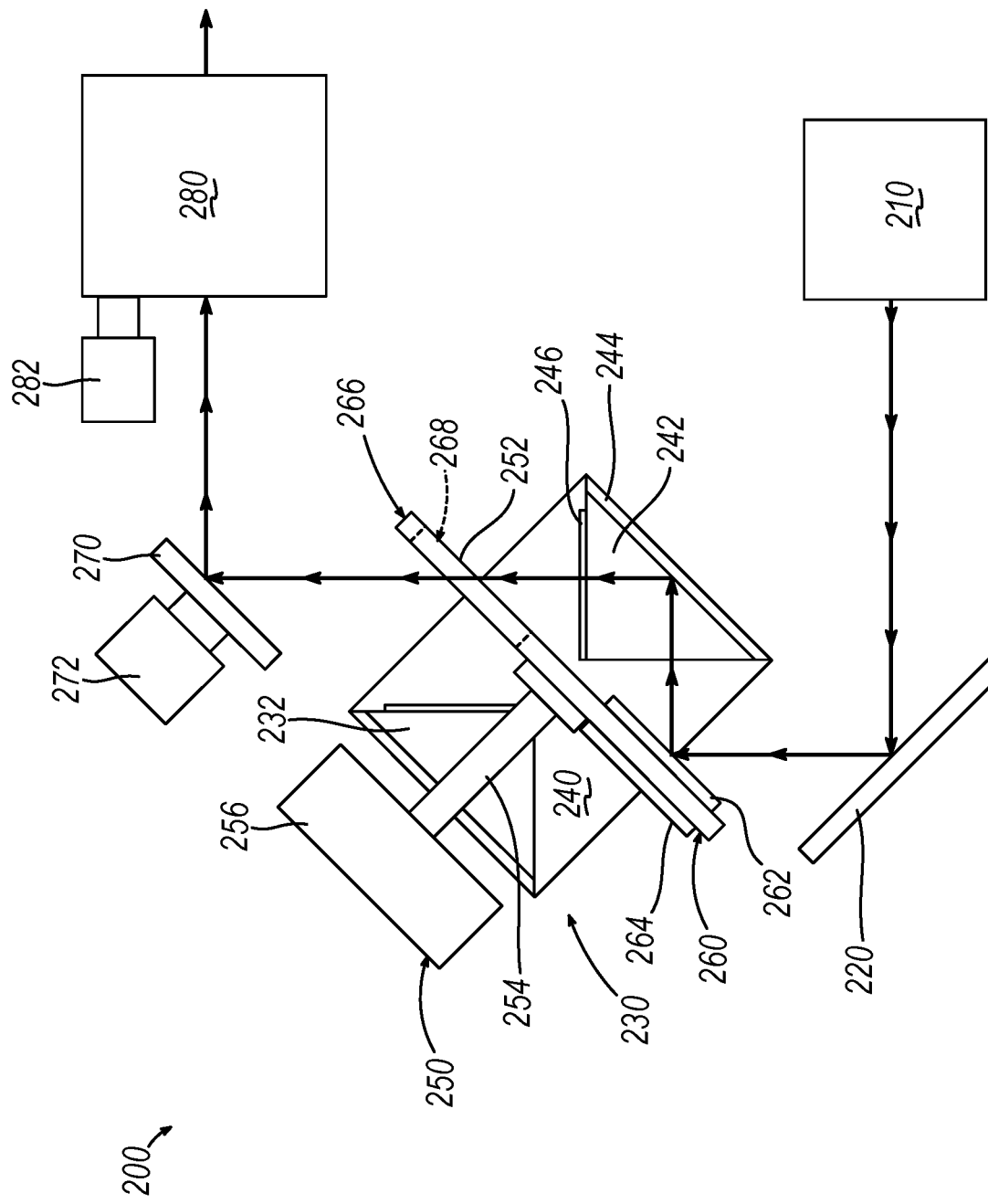
FIG. 5A depicts a schematic diagram of the optical assembly of FIG. 3 with a grating switcher in a first state and an adjustable reflecting element in a first state.
Figure 5B:
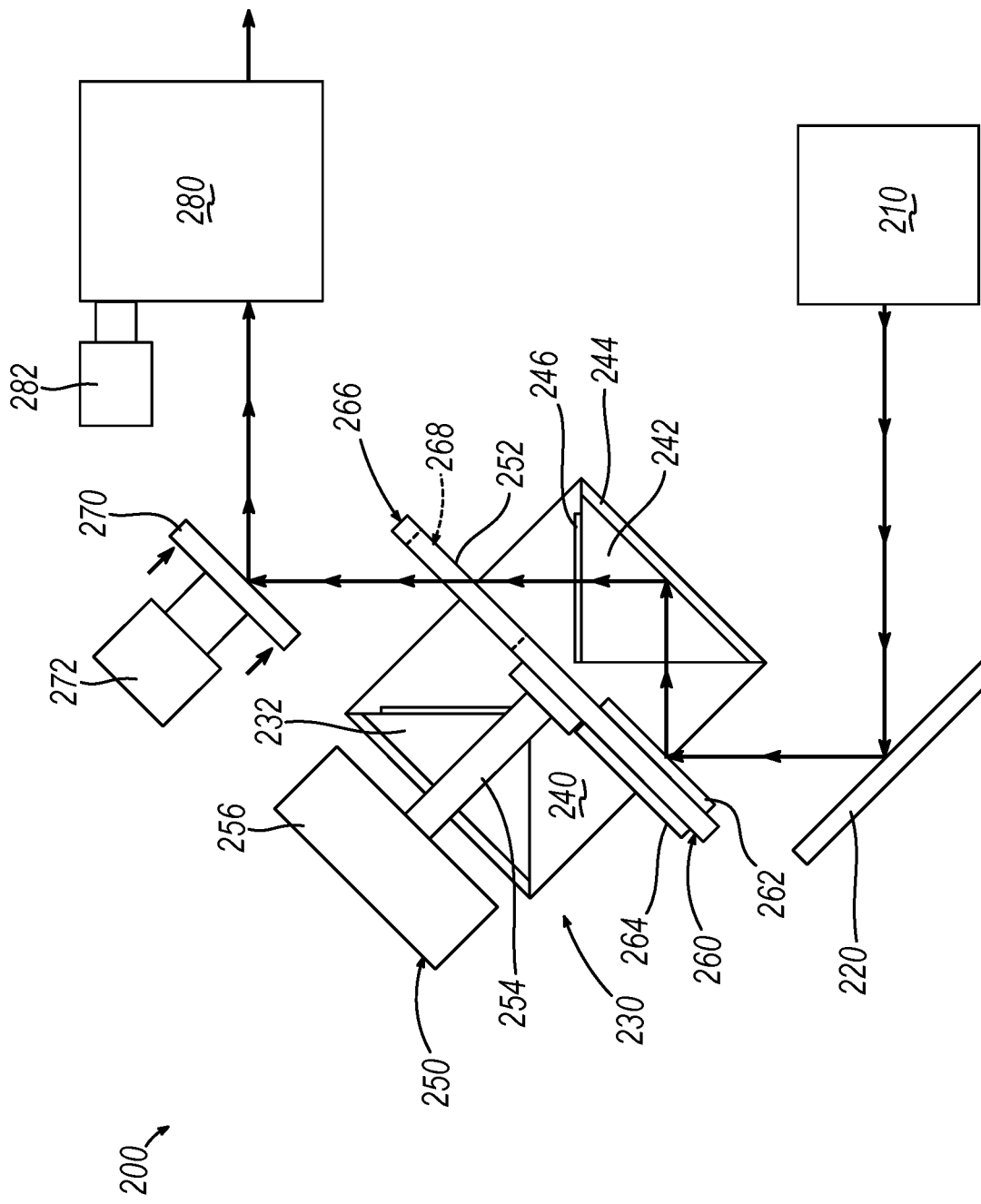
FIG. 5B depicts a schematic diagram of the optical assembly of FIG. 3 with the grating switcher in the first state and the adjustable reflecting element in a second state.

After the first image is acquired with the configuration of optical system 200 shown in FIG. 5A, actuator 272 is activated to drive reflecting element 270 from a first position on the linear path LP1 to a second position on the linear path LP1, such that optical system 200 is then in the configuration shown in FIG. 5B. At the stage shown in FIG. 5B, light emitting assembly 210 emits light toward reflecting element 220, which reflects the light toward phase mask assembly 230 and grating switcher 250. At this stage, grating switcher 250 is in a first state such that the light reflected from reflecting element 220 is further reflected by mirror 262. The light reflected by mirror 262 passes through glass element 242 and reaches reflector 244, which reflects the light toward phase mask 246. As the light passes through phase mask 246, phase mask 246 provides a patterned form to the light. This patterned or structured light then passes through opening 268 of plate 252 and reaches reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

The only difference between the stage shown in FIG. 5A and the stage shown in FIG. 5B is that reflecting element 270 is in a second state (i.e., at a second position along the linear path LP1). Thus, because reflecting element 270 is at a different position during this stage of operation, the image captured with optical assembly 200 in the configuration shown in FIG. 5B will have a different phase than the image captured with optical assembly 200 in the configuration shown in FIG. 5A.

In some versions of the process described herein, actuator 272 is activated to drive reflecting element 270 to a third position along linear path LP1 while grating switcher 250 is in the first state, before proceeding to the stage shown in FIG. 5C and described below. In such versions of the process, camera system 140 may capture three images while grating switcher 250 is in the first state, with each of these images representing a different phase based on the respective positions of reflecting element 270 along the linear path LP1. Of course, actuator 272 may also be activated to drive reflecting member 270 to a fourth position, fifth position, etc., such that any desired number of phases may be employed during the capture of images while grating switcher 250 is in the first state.

Figure 5C:
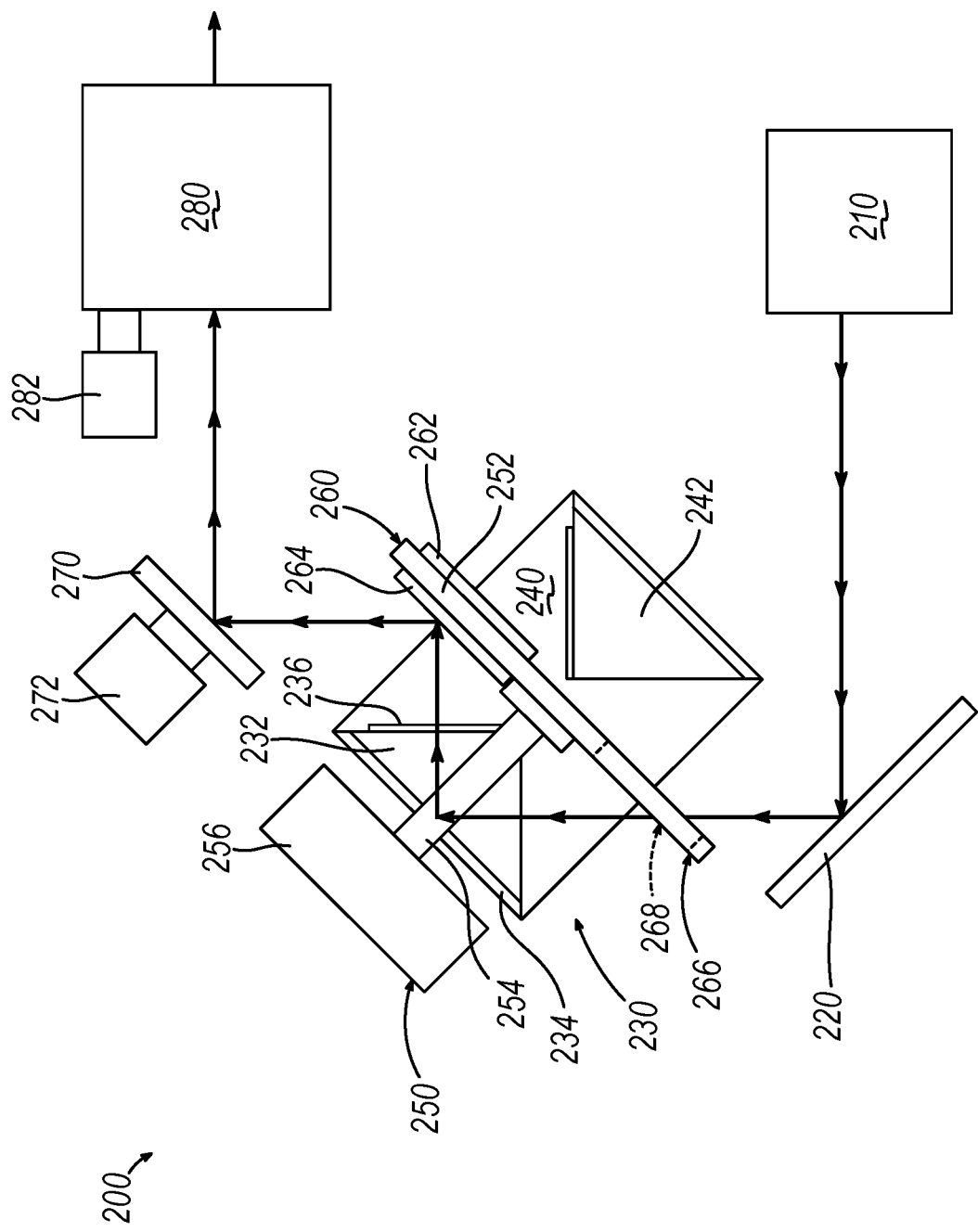
FIG. 5C a schematic diagram of the optical assembly of FIG. 3 with the grating switcher in a second state and the adjustable reflecting element in the first state.
Figure 5D:
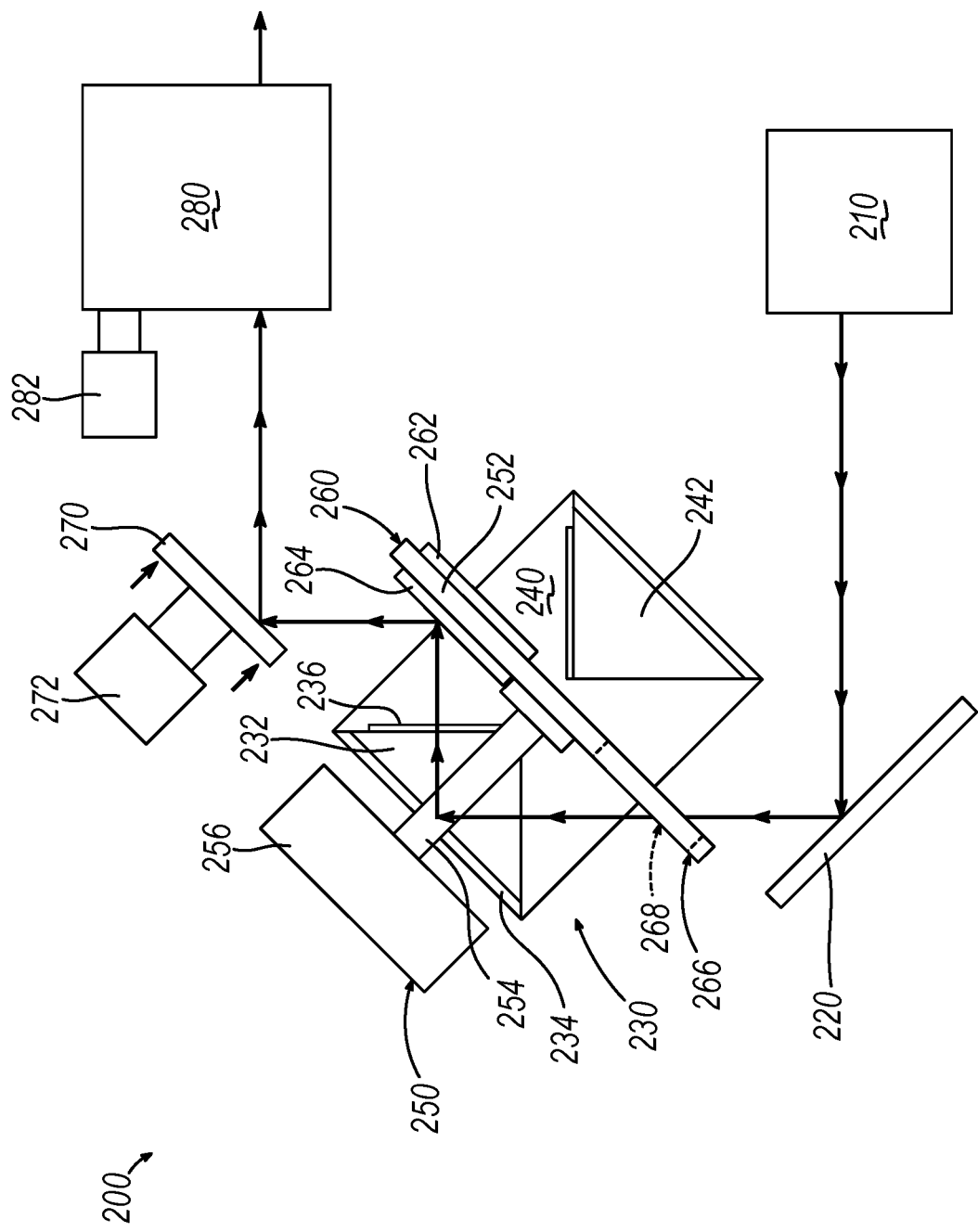
FIG. 5D a schematic diagram of the optical assembly of FIG. 3 with the grating switcher in the second state and the adjustable reflecting element in the second state.

After the desired number of images have been acquired with grating switcher 250 in the first state shown in FIGS. 5A-5B, motor 256 is activated to rotate shaft 254 about the axis A, thereby rotating plate 252 about the axis A, to transition grating switcher 250 to the second state shown in FIGS. 5C-5D. At the stage shown in FIG. 5C, actuator 272 has also been activated to return reflecting element 270 from the second state (i.e., the second position on the linear path LP1) back to the first state (i.e., the first position on the linear path LP1). In some other versions, reflecting element 270 remains in the second state immediately following the transition of grating switcher 250 from the first state to the second state; and reflecting element 270 is transitioned to the first state after an image has been captured while reflecting element 270 is in the second state and grating switcher 250 is in the second state.

At the stage shown in FIG. 5C, light emitting assembly 210 emits light toward reflecting element 220, which reflects the light toward phase mask assembly 230 and grating switcher 250. With grating switcher 250 now in the second state, the light reflected from reflecting element 220 passes through opening 268 and passes further through glass element 232. The light passed through glass element 232 reaches reflector 234, which reflects the light toward phase mask 236. As the light passes through phase mask 236, phase mask 236 provides a patterned form to the light. This patterned or structured light is then reflected off of mirror 264. Mirror 264 reflects the structured light toward reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

After the image is acquired with the configuration of optical system 200 shown in FIG. 5C, actuator 272 is activated to drive reflecting element 270 from the first state (i.e., the first position on the linear path LP1) to the second state (i.e., the second position on the linear path LP1), such that optical system 200 is then in the configuration shown in FIG. 5D. At the stage shown in FIG. 5D, light emitting assembly 210 emits light toward reflecting element 220, which reflects the light toward phase mask assembly 230 and grating switcher 250. With grating switcher 250 now in the second state, the light reflected from reflecting element 220 passes through opening 268 and passes further through glass element 232. The light passed through glass element 232 reaches reflector 234, which reflects the light toward phase mask 236. As the light passes through phase mask 236, phase mask 236 provides a patterned form to the light. This patterned or structured light is then reflected off of mirror 264. Mirror 264 reflects the structured light toward reflecting element 270, which then reflects the structured light toward projection lens assembly 280. After passing through projection lens assembly 280, the structured light reaches the object targeted for imaging (e.g., the sample container 110); and camera system 140 captures another image of the targeted object.

The only difference between the stage shown in FIG. 5C and the stage shown in FIG. 5D is that reflecting element 270 is in the second state (i.e., at the second position along the linear path LP1). Thus, because reflecting element 270 is at a different position during this stage of operation, the image captured with optical assembly 200 in the configuration shown in FIG. 5D will have a different phase than the image captured with optical assembly 200 in the configuration shown in FIG. 5C.

In some versions of the process described herein, actuator 272 is activated to drive reflecting element 270 to a third position along linear path LP1 while grating switcher 250 is in the second state, before completing the process of capturing images. In such versions of the process, camera system 140 may capture three images while grating switcher 250 is in the second state, with each of these images representing a different phase based on the respective positions of reflecting element 270 along linear path LP1. Of course, actuator 272 may also be activated to drive reflecting member 270 to a fourth position, fifth position, etc., such that any desired number of phases may be employed during the capture of images while grating switcher 250 is in the second state.

As noted above, the image capture process may be carried out through two or more separate channels (e.g., a blue channel and a green channel). In other words, the process described above with reference to FIGS. 5A-5D may be carried out through two or more separate channels. Light emitting assembly 210 may be operable to provide both channels; or each channel may have its own light emitting assembly 210. In some versions, the two separate channels are activated simultaneously through optical assembly 200. In some other versions, a first channel is activated during the stage shown in FIG. 5A, then a second channel is activated during the stage shown in FIG. 5A, then the first channel is activated during the stage shown in FIG. 5B, then the second channel is activated during the stage shown in FIG. 5B, and so on, until the second channel is activated during the stage shown in FIG. 5D. As yet another example, each channel may have its own dedicated optical assembly 200. In some such versions, further optical components may be utilized to enable the projection lens assembly 280 of each optical assembly 200 to project the light from each channel to the same target (e.g., sample container 110). Other suitable ways in which one or more optical assemblies 200 may enable use of two or more channels will be apparent to those skilled in the art in view of the teachings herein. It should also be understood that other components within system 100 (e.g., filter switching assembly 165) may further enable use of two or more channels. In versions where one channel is blue and another channel is green, the blue channel may operate with light at a wavelength in the range from approximately 450 nm to approximately 500 nm; and the green channel may operate with light at a wavelength in the range from approximately 500 nm to approximately 570 nm.

As also noted above, the subject matter that is imaged with use of optical assembly 200 in system 100 may include one or more biological samples (e.g., nucleotides, etc.) in nanowells on a flow cell, such that some forms of sample container 110 may include flow cell. Such nanowells may be arranged in a regular repeating pattern. For a rectangular pattern, two structured illumination angles may be used, substantially along two diagonals connecting opposing corners of a rectangle in the pattern, so that intensity peaks of the structured illumination are oriented substantial normal to the two diagonals. Alternatively, the structured illumination angle may be oriented along the same direction as the rectangular nanowell pattern direction (i.e., not along the opposing corners of the rectangle).

For a repeating hexagonal pattern of nanowells, with three diagonals connecting opposing corners of hexagons in the pattern, three structured illumination angles may be used with intensity peaks that are oriented substantial normal to the three diagonals. Alternatively, a two-angle illumination pattern may be used in conjunction with a flow cell having a hexagonal pattern of nanowells, such that it is not necessary in all cases to use three structured illumination angles in conjunction with a hexagonal pattern of nanowells. Moreover, the structured illumination angle may be oriented along the same direction as the hexagonal nanowell pattern direction (i.e., not along the opposing corners of the hexagon).

Regardless of the kind of pattern of nanowells, adjacent nanowells may be positioned closer together than the Abbe diffraction limit of the associated optical system. Alternatively, samples may be randomly distributed over an imaging plane without nanowells. Or, the samples may be regularly arranged over the imaging plane on some structure other than nanowells.

IV. Examples of Image Processing Algorithms

A. Overview of SIM Image Processing Method

An image captured by an optical sensor or image sensor (e.g., as integrated into camera system 140) may be referred to as a tile. Image processing algorithms as described below may subdivide a captured image tile into sub-tiles. Each sub-tile may be evaluated independently. A near-center sub-tile may be handled differently than other sub-tiles. An imaging cycle for a flow cell may capture many image tiles with some overlap. Sub-tiles may be reconstructed independently of one another, even in parallel. Reconstructions from enhanced sub-tiles may be stitched together to create a reconstructed tile with enhanced spatial resolution. In some instances, an image tile is subdivided into sub-tiles such that the peak lines are approximately evenly spaced within a sub-tile, thereby achieving better image quality from reconstructed sub-tiles across a field of view of a lens.

In some instances, at least three parameters are mapped for each sub-tile. Such parameters may include illumination peak angle, illumination peak spacing, and phase displacement. The illumination peak angle may also be referred to as grating angle. The illumination peak spacing may also be referred to as grating spacing. In other words, the illumination peak spacing defines the periodicity of the grating (e.g., the spacing between parallel lines defined by phase masks 236, 246). The phase displacement or the phase is the shift of the structured illumination pattern or grating as projected onto the sample plane (e.g., based on the position of reflecting element 270 along the linear path LP1, as driven by actuator 272). In other words, the phase may be defined as the distance from a common reference point to the start of the repeating illumination pattern in the direction orthogonal to the grating. The phase may be expressed in radians or degrees; and may be regarded as a fraction of the repeating pattern periodicity. The phase displacement may also be referred to as the grating phase. The angle and spacing may be mapped using quadratic surface distortion models.

The following describes examples of techniques that may be used to estimate parameters for SIM image reconstruction. Some of the techniques disclosed compensate for fringe peak lines that are distorted or bent due lens imperfections. Pattern lines that are supposed to be parallel begin that way near the center of the image but tend to converge or become non-parallel near the edge of the lens. This impacts illumination peak angle or orientation, illumination peak spacing, and phase offset. FIG. 8A illustrates dividing an image tile into overlapping regions referred to as sub-tiles or sub-windows or sub-fields. The sub-tiles are small enough that parameters may be set that will give satisfactory reconstruction for a whole sub-tile. In some versions, each sub-tile includes 512 by 512 pixels of the optical sensor. Larger or smaller numbers may be used, including but not limited to 256, 400, 1024, 2048 and 4096; or in a range from 256 to 4096 pixels. The sub-tiles may overlap by at least 2 pixels of the optical sensor. Larger or smaller numbers may be used. For example, for a 512-pixel wide window, up to a 256-pixel overlap may be used; and for 1024 pixels wide, up to a 512 overlap may be used.

The parameter estimation may be performed in two steps. First, parameter estimation may be performed for a near-center sub-tile of the image. Then, parameter estimation may be performed for other sub-tiles and compared to the near-center sub-tile to determine distortions and corrections for the distortions, relative to parameters for the near-center sub-tile.

Figure 6B:
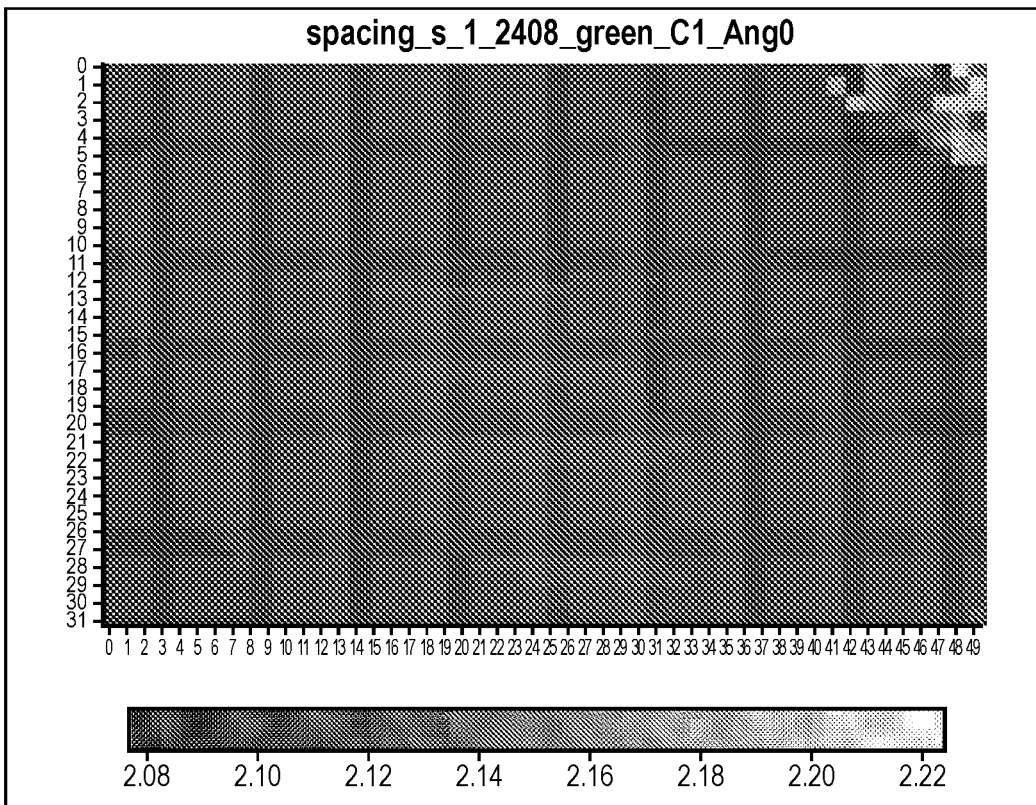
FIG. 6B illustrates a first set of measurements made to wavelengths of spacing between nominally parallel lines.
Figure 6C:
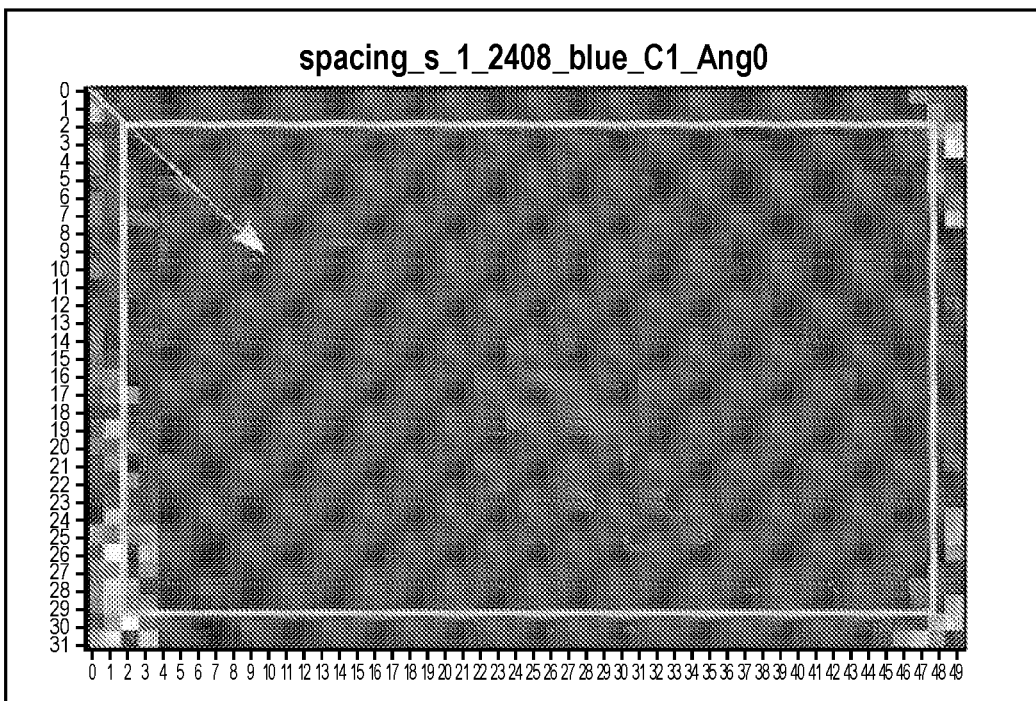
FIG. 6C depicts a second set of measurements made to wavelengths of spacing between nominally parallel lines.

FIGS. 6A to 6C illustrate physical aspects of the full field of view (FOV). In one implementation, the rectangular sensor is used that is 5472 pixels by 3694 pixels. Of course, a square sensor or a different size of sensor may be used, for example, 5472×5472 pixels, or 4800×4800 pixels. When a rectangular sensor is used, distortion is greatest closest to the edge of the lens. A lens often is round, so a rectangular sensor does not come as close to the edge of the lens on the long side as it does on the short side.

FIG. 6A presents two illustrations that show fringe spacing distortion across the full field of view (FOV). The FIG. 300 on the left is a simplified depiction 300 of bending parallel lines due to distortion of a lens that magnifies. The lines depicted are intended to be parallel in the image plane. Viewed through a lens, they appear to converge at right and left ends, relative to spacing in the center. The FIG. 302 on the right is another exaggerated example. In this figure the fringe lines are oriented diagonally between top left and bottom right corners. The fringe spacing is exaggerated to make it easier to see. The fringe lines converge at the top left and bottom right corners, relative to the center. For a particular manufacturer's lens, the fringe pattern may be non-uniform.

FIGS. 6B and 6C depict measurements of spacing in an image between nominally parallel fringe peaks in the image plane, for green and blue laser illumination. The color scale indicates a variation in spacing between 2.8 and 2.22. In both drawings, the color scale indicates that the center spacing between parallel lines is approximately 2.14. Irregularity under green wavelength illumination is seen in the top right-hand corner of FIG. 6B. More substantial irregularity under blue wavelength illumination is seen in FIG. 6C, along the right and left edges. In these figures, the fringe pattern was a series of parallel lines at an angle of 45°, from bottom left to top right of the figures. Thus, the spacing is measured in the direction of the arrow in FIG. 8C. These figures motivate correction of distortions caused by the lens. Since lenses are individually manufactured and mounted, calibration and correction of individual systems after assembly is desirable.

Figure 6D:
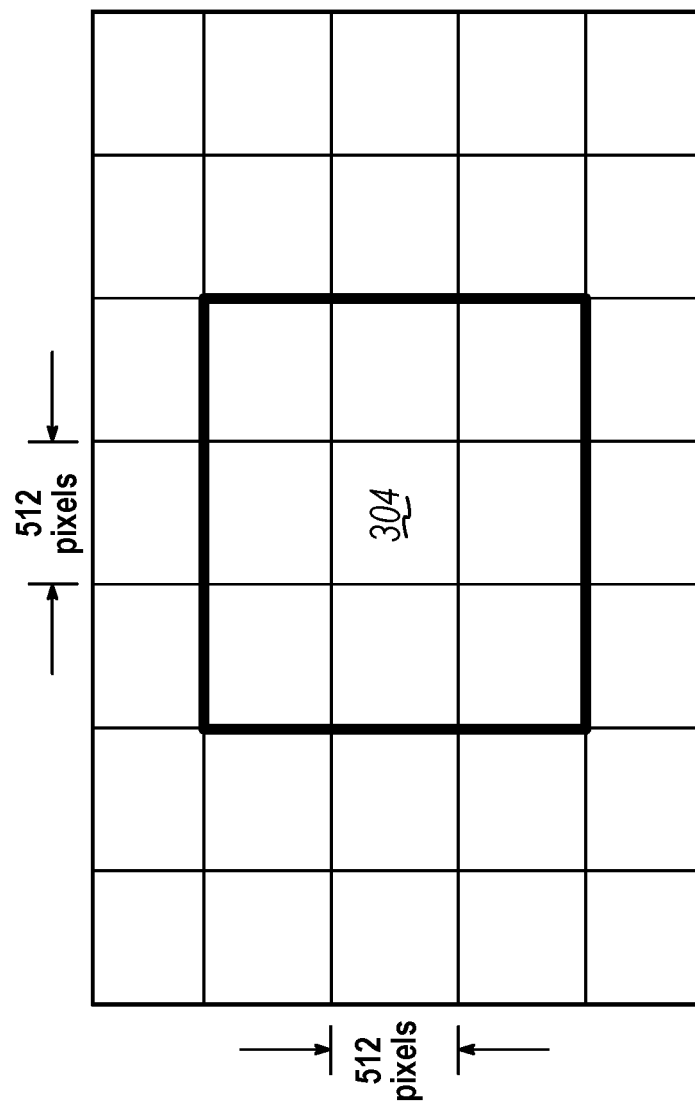
FIG. 6D depicts an example of sub-tiles or sub-fields of a full field of view (FOV) image.

FIG. 6D illustrates sub-tiles or subfields of the full field of view (FOV) in an image tile. In this figure, the sub-tile illustrated is 512 pixels by 512 pixels. These sub-tiles may subdivide the field of vision, shown, or may overlap. Sub-tiles may be larger or smaller. For instance, 400×400 and 1024×1024 pixel sub-tiles have been shown to be workable. The figure illustrates 5×7 sub-tiles. The larger sensor called out above may have 8×11 sub-tiles. Other configurations of sub-tiles such as 3×3, 5×5, 5×7, 9×9, 9×16 may be used. Larger sensors may be divided into more sub-tiles. The sub-tiles may overlap by at least 2 pixels of the optical sensor. Larger and smaller number of pixels may be used for overlapping between sub-tiles. For example, for a 512-pixel wide sub-tile, up to a 256-pixel overlap may be used, and for a 1024-pixel wide sub-tile, up to a 256-pixel overlap may be used. Consistent with FIGS. 6B and 6C, there are several candidate near-center sub-tiles 304, all in the sweet spot of the lens, including a center sub-tile in an odd×odd sub-tile array. As used herein, a near-center sub-tile either includes a center pixel of the sensor or abuts a sub-tile that includes the center pixel. In some optical systems that are flat and have small error, a sub-tile further from the ones adjoining the center sub-tile may be used as a reference without impacting the overall distortion compensation.

The technology disclosed includes mapping distortion measured over substantially the full field of view captured by the image sensor. Three parameters on which enhanced resolution SIM reconstruction from regularly structured illumination depend include fringe spacing, fringe angle, and phase displacement of the fringe pattern. These variables are also referred to as spacing, angle and phase offset of the structured illumination or grating pattern. The spacing and angle deviations from the center tile value may be fit across the full field of view using polynomial surfaces. Both quadratic and cubic surfaces have been investigated. Higher order polynomials also may be used.

Both the fringe spacing and fringe angle across the image tile may be fit by quadratic surfaces. Sensitivity analysis shows that quadratic surfaces fit very nearly as well as cubic surfaces. A quadratic surface is fit to the following equation (II):

$$f(x,y)=c0+(c1*x)+(c2*y)+(c3*x*y)+(c4*x^2)+(c5*y^2) \qquad (II)$$

One implementation of phase estimation adapts the technique proposed by Wicker et al. 2013, in their paper titled, "Phase Optimisation for Structured Illumination Microscopy", section 3. Equations from Lal et al. 2015 titled, "Structured Illumination Microscopy Image Reconstruction Algorithm," and from Wicker et. al. 2013 help explain Wicker phase estimation.

Equation (III) below, taken from Lal et al. 2015 separates three bands of frequency components: $\tilde{S}(k)\,\tilde{H}(k);\,\tilde{S}(k-p_\Theta)\,\tilde{H}(k);\,\tilde{S}(k+p_\Theta)\,\tilde{H}(k)$ from acquired images $\tilde{D}_{\Theta,\varphi_1}(k)$, $\tilde{D}_{\Theta,\varphi_2}(k)$, $\tilde{D}_{\Theta,\varphi_3}(k)$. The mixing matrix uses estimates of the phases $\varphi_1$, $\varphi_2$, and, $\varphi_3$ of images captured using a sinusoidal illumination intensity pattern $I_{\Theta,\varphi}(r)$, corresponding to a pattern angle or orientation 0. Wicker et. al. 2013 refer to phase for $n^{th}$ image at an orientation as $\varphi_n$. If phases are not known with sufficient precision, the unmixing or band separation process will imperfectly separate the spatial frequency components from the observed images $\tilde{D}_{\Theta,\varphi_1}(k)$, $\tilde{D}_{\Theta,\varphi_2}(k)$, $\tilde{D}_{\Theta,\varphi_3}(k)$ in frequency domain. Practically, the three spatial frequency components $\tilde{S}(k)\,\tilde{H}(k);\,\tilde{S}(k-p_\Theta)$ $\tilde{H}(k)$; $\tilde{S}(k+p_\Theta)$ $\tilde{H}(k)$ will contain more or less residual information from other components, as represented by the noise term provided through the following equation (III):

$$\begin{bmatrix} \tilde{D}_{\theta,\phi_1}(k) \\ \tilde{D}_{\theta,\phi_2}(k) \\ \tilde{D}_{\theta,\phi_3}(k) \end{bmatrix} = \frac{l_o}{2} M \begin{bmatrix} \tilde{S}(k)\tilde{H}(k) \\ \tilde{S}(k-p_\theta)\tilde{H}(k) \\ \tilde{S}(k+p_\theta)\tilde{H}(k) \end{bmatrix} + \begin{bmatrix} \tilde{N}_{\theta,\phi_1}(k) \\ \tilde{N}_{\theta,\phi_2}(k) \\ \tilde{N}_{\theta,\phi_3}(k) \end{bmatrix} \quad (III)$$

$$\text{where } M = \begin{bmatrix} 1 & -\frac{m}{2}e^{-i\phi_1} & -\frac{m}{2}e^{+i\phi_1} \\ 1 & -\frac{m}{2}e^{-i\phi_2} & -\frac{m}{2}e^{+i\phi_2} \\ 1 & -\frac{m}{2}e^{-i\phi_3} & -\frac{m}{2}e^{+i\phi_3} \end{bmatrix}$$

This formulation with three components follows from the Fourier transform for sine or cosine illumination. A different illumination function may change the equations.

Precise knowledge of the illuminating sinusoidal intensity pattern phases may therefore be important. As it is not always possible to precisely control these phases in experimental setup, it may be desirable to determine the illumination pattern phases from the acquired image data. Wicker et. al. 2013 present a phase estimation technique for SIM data acquired using coherent sinusoidal illumination at a selected frequency. Coherent illumination produces good pattern contrast from fine gratings with a very small illumination peak spacing 's', which enhances the reconstructed resolution. We retrieve illumination pattern phase of the $n^{th}$ image using the illumination pattern's peak frequency. The illumination pattern's peak frequency is also referred to as Fourier peak.

Equation (IV) below, from Wicker et. al. 2013, presents a generalized form of equation (II) with acquired images $\tilde{D}_n(\vec{k})$ over frequencies $\vec{k}$ in the frequency domain. Each image comprises of three components that are referred to as $\tilde{C}_{-1}(\vec{k})$, $\tilde{C}_0(\vec{k})$, $\tilde{C}_{+1}(\vec{k})$ superimposed with different phases. Note that these three (IV) components are the same three components as $\tilde{S}(k)$ $\tilde{H}(k)$; $\tilde{S}(k-p_\Theta)$ $\tilde{H}(k)$; $\tilde{H}(k+p_\Theta)$ $\tilde{S}(k)$ in equation (III).

$$\tilde{D}_n(\vec{k}) = e^{-i\phi_n}\tilde{C}_{-1}(\vec{k}) + \tilde{C}_0(\vec{k}) + e^{i\phi_n}\tilde{C}_{+1}(\vec{k})$$
$$= \frac{c}{2}e^{-i\phi_n}\tilde{S}(\vec{k}+\vec{p})\tilde{h}(\vec{k}) + \tilde{S}(\vec{k})\tilde{h}(\vec{k}) + \frac{c}{2}e^{i\phi_n}\tilde{S}(\vec{k}-\vec{p})\tilde{h}(\vec{k})$$

Note that 'c' in equation (IV) is referred to as contrast of the illumination pattern. In the absence of noise, 'c' is the same as the modulation factor 'm' in mixing matrix M in equation (2). To determine $\varnothing_n$, the frequency $\vec{k}$ in equation (IV) is replaced with $\vec{p}$ which is peak frequency of illumination pattern, resulting in the following equation (V):

$$\phi_n \approx \arg\{\tilde{D}_n(\vec{p})\} \quad (V)$$
$$= \arg\left\{\frac{c}{2}e^{-i\phi_n}\tilde{S}(2\vec{p})\tilde{h}(\vec{p}) + \tilde{S}(\vec{p})\tilde{h}(\vec{p}) + \frac{c}{2}e^{-i\phi_n}\tilde{S}(0)\tilde{h}(\vec{p})\right\}$$

Equation (V) shows that pattern phase $\varnothing_n$ is approximately equal to the phase of the acquired image $\tilde{D}_n(\vec{p})$ over frequency $\vec{p}$. This approximate estimation of the pattern phase $\varnothing_n$ may yield good results when three guidelines are followed. First, the contrast c of the illumination pattern should to be sufficiently large. Second, the sample power spectrum should decrease sufficiently fast with growing frequency. When these two guidelines are followed, equation (V) is dominated by the last term and therefore, may be simplified to the following equation (VI):

$$\phi_n \approx \arg\{e^{i\phi_n}\tilde{S}(0)\tilde{h}(\vec{p})\} \quad (VI)$$

For any real valued sample, the center frequency $\tilde{S}(0)$ will be real valued. Further, if the point spread function (PSF) h($\vec{r}$) is real and symmetrical, the optical transfer function (OTF) $\tilde{h}(\vec{k})$ will be real. An OTF is a convolution of the point spread function (PSF). A point spread function is the spatial domain version of the optical transfer function of the imaging system. The name "point spread function" indicates that all physical optical systems blur (spread) a point of light to some degree, with the amount of blurring being determined by the quality of the optical components. The resolution of the imaging system is limited by the size of the PSF. For asymmetrical PSFs the phases of the OTFs, should be taken into account.

Third, the OTF at the pattern frequency $\tilde{h}(\vec{p})$ should be sufficiently large to overcome noise. If the OTF is too small, noise in the acquired image may significantly alter the phase measured at $\vec{p}$. This phase estimation method cannot be used for pattern frequencies $\vec{p}$ outside for the support of the detection OTF. For such frequencies, $\tilde{h}(\vec{p})=0$.

An optical system's OTF may be determined experimentally. For example, Lal et al. 2015 compute the OTF by obtaining several images of samples with sparsely distributed 100 nm fluorescent microspheres. Intensity distribution corresponding to more than 100 microspheres were then super-imposed and averaged to obtain an approximation for the system PSF. Fourier transform of this PSF provides an estimate of system OTF. With this background, the phase estimation technique may be applied to sub-tiles.

It may be useful to estimate phase displacement of tiles relative to the full field of view (FOV), so that measurement of phase in one sub-tile may be extrapolated to other sub-tiles across the tile. The illumination peak angle and illumination peak spacing for the full FOV may be estimated from the illumination peak angle and illumination peak spacing of the sub-tile using the quadratic models presented above. The phase displacement may be less regular because it depends pixel geometry of sub-tiles, which may produce an irregular step function, instead of a smooth function. Phase estimates may be represented using a common frame of reference across sub-tiles of the full FOV image. Sub-tile coordinate spaces may be mapped to a the full FOV coordinate space.

B. Example of Quality Control Methods for SIM System

Various structural and operational parameters in a SIM optical system may adversely impact the quality of the SIM-reconstructed super resolution images. For instance, in any optical system containing lenses (e.g., within lens assembly 280 described above, some other lens that is integrated into camera system 140), at least one lens may include one or more structural aberrations, which may produce distortions in images captured by camera system 140. As another example, the positioning of components within optical assembly 200 or elsewhere within the optical path of system 100 may deviate from a predefined specification, and such deviations may produce distortions in images captured by camera system 140. Calculations used in SIM reconstruction may be sensitive to distortions in source images that are captured using lenses with aberrations or using an optical assembly 200 having other aberrations. Increasing the field of view, using most of the lens instead of a sweet spot in the center, may enhance the susceptibility of SIM image reconstruction to the distortions caused by aberrations in the lens. Thus, examples described below provide solutions to the image distortion challenges identified above by providing systems and methods for detecting the above-described aberrations (and other aberrations); and making adjustments as needed to account for such aberrations (if possible). In other words, the following describes examples of how to conduct a quality control check or validation of structural and operational parameters in a SIM optical system to determine whether they are within predefined specifications. The quality control and validation teachings provided below may thus provide benefits of overcoming known challenges presented by aberrations in lenses or other components of optical assemblies.

A quality control check process may include a comparison between two focal planes—one being the optical focal plane and the other being the SIM grating focal plane. The optical focal plane may be established by observing the position of objective lens 142 providing the best focus of the biological sample in sample container 110. In the present example, the optical focal plane may be adjusted by moving the objective lens 142 of system 100 toward and away from sample container 110 along the z axis. The SIM grating focal plane may be adjusted by moving projection lens assembly 280 along the linear path LP2 by activating actuator 282. The SIM grating focal plane may be established by observing the position of projection lens assembly 280 at which peak quality fringes or peak interference may be observed from the structured light patterns provided by phase masks 236, 246. The ideal SIM assembly configuration may provide a SIM grating focal plane that is as close to the optical focal plane as possible (e.g., a SIM grating focal plane within approximately 10 nm of the optical focal plane). This difference between the SIM grating focal plane and the optical focal plane may be regarded as a "co-focus."

The following description refers to treatment of SIM stacks in a method of processing. In the present example, each SIM stack includes twelve images—six images from two channels. For each channel, the set of six images includes three images taken with reflecting element 270 at three different positions along the linear path LP1 while grating switcher 250 is in the first state (e.g., as shown in FIGS. 5A-5B) and another three images taken with reflecting element 270 at the same three different positions along the linear path LP1 while grating switcher 250 is in the second state (e.g., as shown in FIGS. 5C-5D). Thus, the set of six images for each channel in a SIM stack represents three different phases for each of two different grating angles or illumination peak angles. Alternatively, any other suitable number of images may be used to form each SIM stack, and such images may differ from each other based on parameters other than those identified above. Each SIM stack may be collected at different z-positions, meaning that each SIM stack may be collected with objective lens 142 being located at a different distance from sample container 110. By way of example only, SIM stacks may be collected at from approximately 20 different z-positions to approximately 40 different z-positions. The different z-positions may be spaced apart at any suitable interval, such as an interval from approximately 0.1 μm to approximately 1.0 μm; or from approximately 0.2 μm to approximately 0.8 μm; or approximately 0.5 μm.

Figure 7:
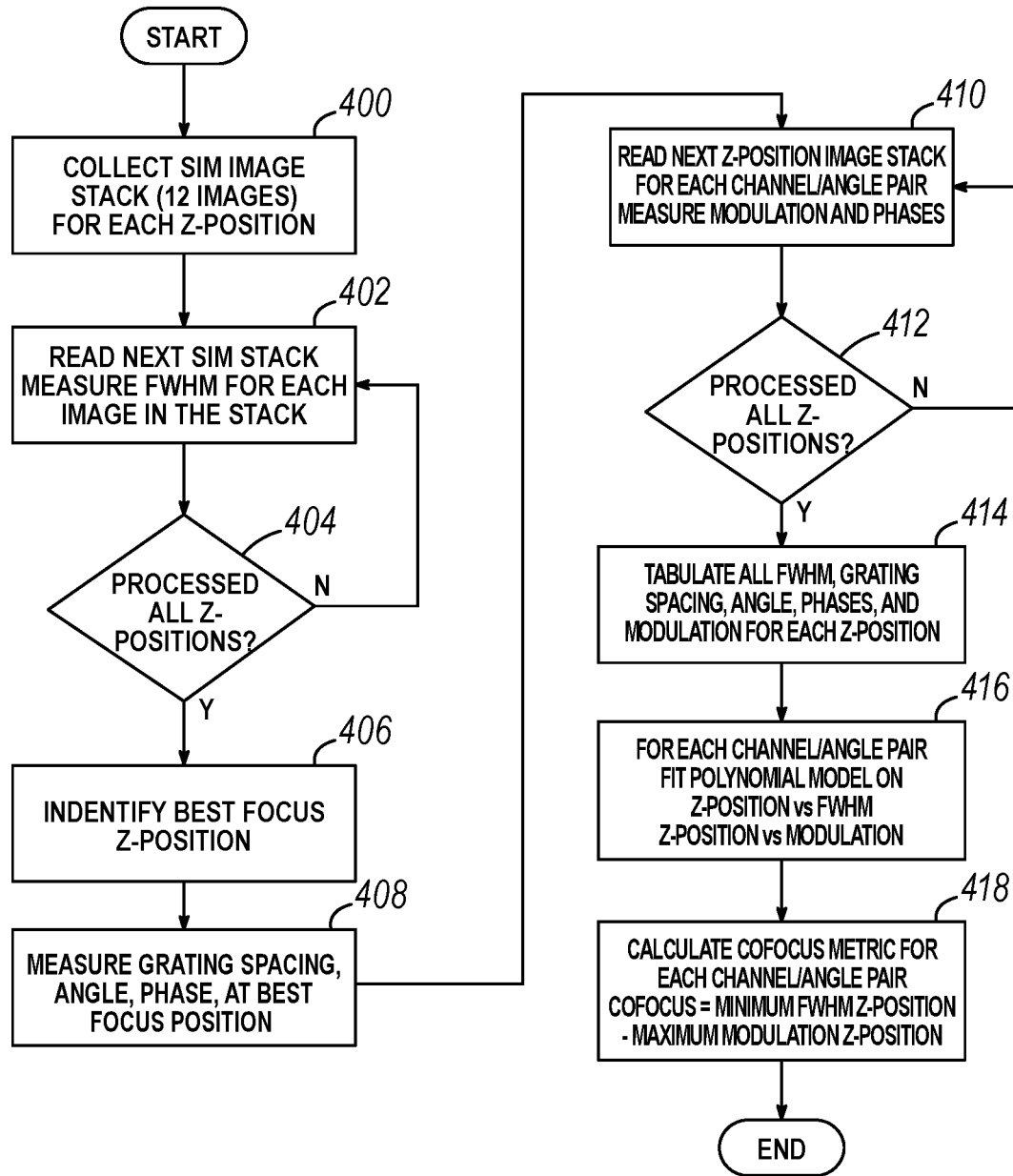
FIG. 7 depicts a flow chart of an example of a process for a quality control check in a SIM imaging system.

The process may begin by collecting a SIM stack for each z-position, as shown in block 400 of FIG. 7. As noted above, each SIM stack may include twelve images. Next, each SIM stack may be read to measure the full width at half maximum (FWHM) for each image in the stack, as shown in block 402 of FIG. 7. The FWHM may be measured on a center estimation window of each channel and each grating angle (with the grating angle being based on the state of grating switcher 250 at the time the image in the SIM stack was captured). To provide the center estimation window, the image may be cropped to a central region, to omit outer edge and corner regions where relatively high distortions may be likely. The measurement of the FWHM value on the center estimation window of each channel and each grating angle may be done using the raw, unreconstructed phase 0 of each angle. Measuring only one phase for each channel-angle pair may save computing costs and may provide results that are sufficient.

After the FWHM is measured for each SIM stack, the process will determine whether additional SIM stacks need to be processed, as shown in block 404 of FIG. 7, it being understood that each SIM stack corresponds to a unique respective z-position. If further SIM stacks need to be processed, the process will continue with measuring the FWHM for those SIM stacks until the FWHM has been measured for all of the SIM stacks. Once the FWHM has been measured for all of the SIM stacks (i.e., all of the z-positions, during a first pass), the process will identify the SIM stack with the best focus z-position, as shown in block 406 of FIG. 7. The process will then measure the grating spacing, angle, and phase for the images in the SIM stack with the best focus z-position, as shown in block 408 of FIG. 7.

After measuring the grating spacing, angle, and phase for the images in the SIM stack with the best focus z-position, the process will then measure modulation and phases for each channel-angle pair in all SIM stacks (i.e., at all z-positions, during a second pass), as shown in blocks 410 and 412 of FIG. 7. The fringe modulation is a quantitative measure of fringe interference pattern strength (valued from 0 to 1 where 1 is the theoretical maximum assuming perfect interference and no transmissive loss). Calculating accurate modulation values is predicated upon accurate estimate of the orientation and periodicity of the fringe pattern. As z-positions that are further away from the grating best focal plane are processed, the modulation values are expected to degrade closer toward 0.

Once the modulation and phases have been measured for each channel-angle pair in all of the SIM stacks (i.e., all of the z-positions), the process will tabulate all FWHM, grating spacing, angle, phases, and modulation for each SIM stack (i.e., each z-position), as shown in block 414 of FIG. 7. After this tabulation is complete, for each channel-angle pair, the process will fit a polynomial model or curve on the z-position versus FWHM and the z-position versus modulation, as shown in block 416 of FIG. 7.

After fitting the polynomial model or curve for each channel-angle pair, the process may calculate the co-focus metric for each channel-angle pair, as shown in block 418 of FIG. 7. This co-focus value may be calculated as follows:

$$\text{co-focus} = \text{minimum FWHM } z\text{-position} - \text{maximum modulation } z\text{-position}. \tag{6}$$

As noted above, it may be desirable to have a co-focus value where the SIM grating focal plane that is as close to the optical focal plane as possible (e.g., a SIM grating focal plane within approximately 10 nm of the optical focal plane).

In some implementations, the process may yield a table or other report. The table or other report may set forth various parameters corresponding to the imaging system at hand, based on the above process. By way of example only, in versions where the report includes a table, the columns of the table may include z-height (i.e., distance between objective lens 142 and sample container 110), channel, angle index, modulation, FWHM, grating spacing, grating angles, and any other suitable parameters. The parameters in the table may be compared against predefined specifications to provide a quality control check.

In the event that any of the parameters in the table or other report deviate from the specifications beyond a tolerable amount, adjustments may be made to optical assembly 200 or other components of system 100 to try to bring those deviating parameters within the specifications. For instance, some versions of optical assembly 200 may enable adjustments to fix phase shifting or modulation. By way of example, in the event that the co-focus value deviates from the specification beyond a tolerable amount, adjustments may include moving projection lens assembly 280, moving camera system 140, moving an electro-optic modulator, or moving some other component. By way of further example, in the event that the phase value deviates from the specification beyond a tolerable amount, adjustments may include calibrating the voltage that is used to drive actuator 272 in order to achieve correct amount of fringe translation at the sample for all optical configurations. By way of further example, in the event that the quality control check reveals aberrations in tilt or chromatism, components camera system 140 may be movably adjusted, though such movements may affect the co-focus. Other suitable kinds of adjustments may be provided as will be apparent to those skilled in the art in view of the teachings herein.

The above-described quality control checking process may be carried out again to see if the adjustments have in fact brought the deviating parameters within the specifications. In the event that it is not possible to make adjustments to bring the deviating parameters within the specifications, the components of optical assembly 200 or other components of system 100 that are responsible for the deviating parameters may be replaced. In the event that such components may not be replaced, it may be desirable to reject optical assembly 200 or system 100 altogether.

C. Example of Phase Calibration Method

As described above, optical system 200 may provide phase shifting through activation of actuator 272, which may change the phase of optical system 200 by changing the position of reflecting element 270 along linear path LP1. As also noted above, actuator 272 may include a piezoelectric motive element or any other suitable components. In versions where actuator 272 includes a piezoelectric motive element, the position of reflecting element 270 along linear path LP1 may vary based on the voltage applied to the piezoelectric motive element. Thus, different phases may be associated with different corresponding voltages provided to actuator 272. The voltage-movement calibration curve for actuator 272 and reflecting element 270 may directly affect the accuracy of the phase movements. This may in turn affect the quality of SIM reconstruction provided through a system 100 incorporating that actuator 272 and reflecting element 270. It may therefore be desirable to provide a method for calibrating the voltages for actuator 272 to achieve accurate phase shifts. An example of such a method is described in detail below with reference to FIG. 8. In some instances, this process may be carried out before optical assembly 100 is first used. In addition, or in the alternative, this process may be carried out in some cases where data obtained using the process described above with reference to FIG. 7 reveals data indicating that the phase shifts of optical assembly 100 are inaccurate.

In the present example, the method of calibrating the voltages for actuator 272 is carried out using a unit of work defined by a twelve-image SIM stack, like the twelve-image SIM stack described above. As described above, this twelve-image SIM stack may include six images from each channel. For each channel, the set of six images includes three images taken with reflecting element 270 at three different positions along the linear path LP1 while grating switcher 250 is in the first state (e.g., as shown in FIGS. 5A-5B) and another three images taken with reflecting element 270 at the same three different positions along the linear path LP1 while grating switcher 250 is in the second state (e.g., as shown in FIGS. 5C-5D). In other words, each set of six images for each channel will have three associated phases (e.g., phase 0, phase 1, and phase 2) for each grating switcher 270 state. Put another way, each channel-angle pair may have three images at three corresponding phases. Of course, the process may instead be applied to any other combination of channel, angle, and phase pairing.

Figure 8:
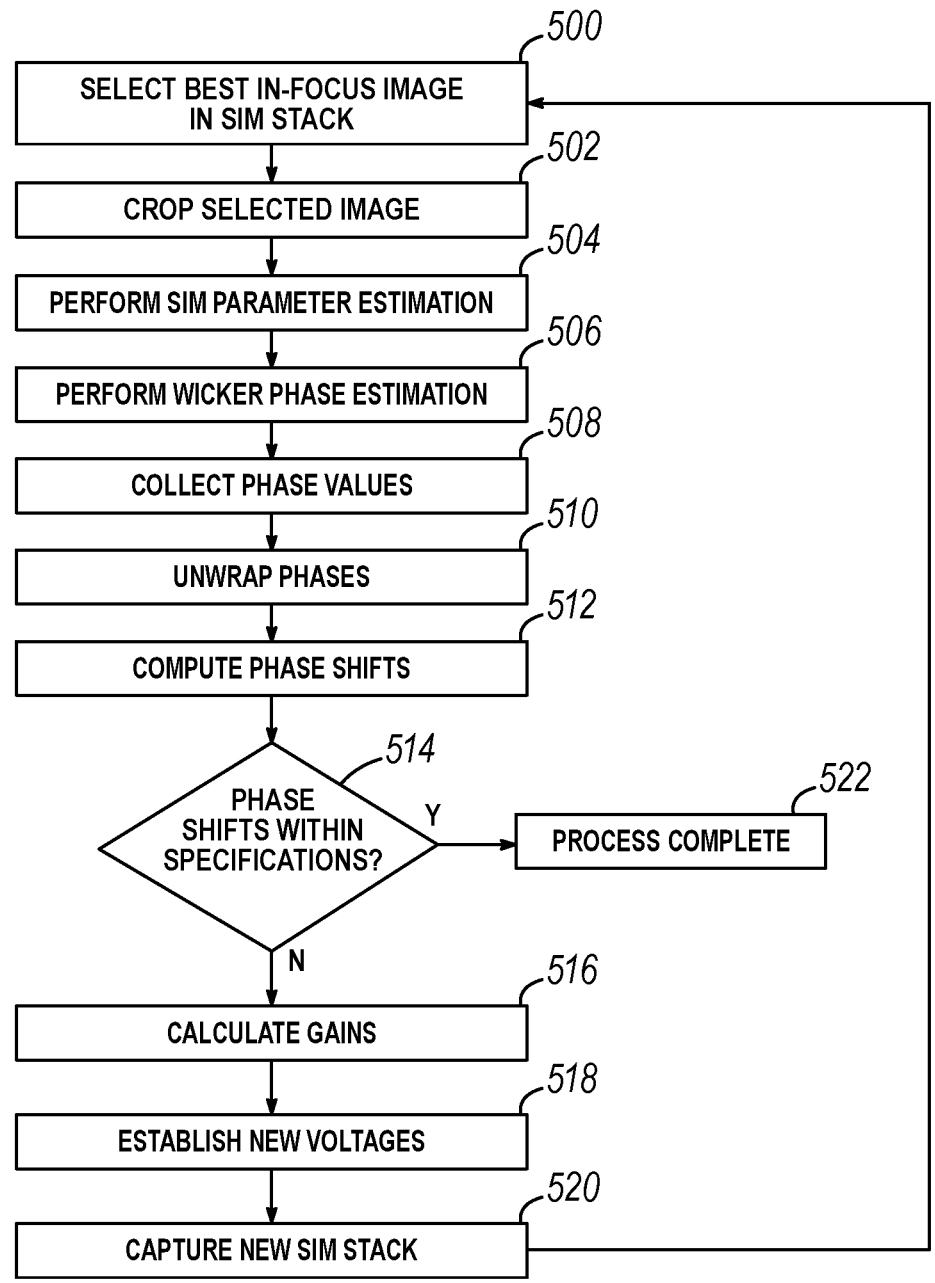
FIG. 8 depicts a flow chart of an example of a process for phase calibration in a SIM imaging system.

As shown in block 500 of FIG. 8, the phase calibration process may start with selecting the image in the SIM stack having the best focus, with an estimation window size N, a phase stepping target for a first phase step (e.g., 120 degrees) and a second phase step (e.g., 240 degrees), and a phase deviation target of less than 10 degrees.

Next, the process may include cropping out a center window of the image field of view to a predetermined size (e.g., 1024×1024 pixels), as shown in block 502 of FIG. 8. With this cropped image, the process may perform SIM parameter estimation to identify the grating spacing, the grating angle, and the modulation for each channel and each angle, as shown in block 504 of FIG. 8. This SIM parameter estimation may be performed in accordance with the teachings provided above in the context of the process shown in FIG. 7.

Once the SIM parameter estimation is completed, the process may perform a Wicker phase refinement procedure for each channel-angle pair, to estimate the phase of each image, as shown in block 506 of FIG. 8. The Wicker phase estimation process may be carried out in accordance with the teachings above.

The process may also collect three phase values from each of the three phase images from each channel-angle pair, as shown in block 508 of FIG. 8. Next, the process may unwrap the phase for each channel-angle pair, as shown in block 510 of FIG. 8, so the phase values are monotonically increasing in steps. This phase unwrapping may include adding 360 degrees to each successive channel-angle pair.

Then, for each channel-angle pair, as shown in block 512 of FIG. 8, the process may compute the phase shifts between the first image and the second image as phase_shift_12=unwrapped phase 2−unwrapped phase 1. Similarly, for each channel-angle pair, the process may then compute the phase shifts between the first image and the third image as phase_shift_13=unwrapped phase 3−unwrapped phase 1.

The process may then evaluate all the phase_shift_12 values and all the phase_shift_13 values through the SIM stack, as shown in block 514 of FIG. 8. If all the phase_shift_12 values and all the phase_shift_13 values are within a predetermined range (e.g., within 10 degrees of a target phase shift step), then the process may be deemed complete, as shown in block 522 of FIG. 8, with the voltages appropriately calibrated.

If the evaluation of all the phase_shift_12 values and all the phase_shift_13 values through the SIM stack reveals that all the phase_shift_12 values and all the phase_shift_13 values are not within a predetermined range, then the process may proceed with a calculation of a proportional gain needed to achieve the desired set-point target for each channel-angle pair, as shown in block 516 of FIG. 8. To that end, the process may compute the gain for the phase shift between the first image and the second image as gain12=120/(phase_shift_12), where the phase_shift_12 value is in degrees. The process may compute the gain for the phase shift between the first image and the third image as gain3=240/(phase_shift_13), where the phase_shift_13 value is in degrees. These proportional gain calculations may be carried out for every channel-angle pair.

After the proportional gain calculations have been completed, the process may establish a new voltage for actuator 272 by applying the calculated gain to the existing voltage value, as shown in block 518 of FIG. 8. For the first phase (e.g., "phase 0"), the voltage may remain unchanged. For the second phase (e.g., "phase 1"), the new voltage may be the original voltage for the second phase (phase 1) multiplied by a factor of the gain12 value as calculated above. For the third phase (e.g., "phase 2"), the new voltage may be the original voltage for the third phase (phase 2) multiplied by a factor of the gain13 value as calculated above. These new voltage calculations may be carried out for every channel-angle pair.

Once the new voltages have been established for every channel-angle pair, the new voltages may be applied to actuator 272 as a new SIM image stack is captured, as shown in block 520 of FIG. 8. The above-described process may then be repeated as shown in FIG. 8, to determine whether the new voltages have brought all the phase_shift_12 values and all the phase_shift_13 values within the predetermined range. If the new voltages have in fact brought all the phase_shift_12 values and all the phase_shift_13 values within the predetermined range, then the process may be complete. If the new voltages have not yet brought all the phase_shift_12 values and all the phase_shift_13 values within the predetermined range, then the process may be reiterated as many times as needed until the voltages bring all the phase_shift_12 values and all the phase_shift_13 values within the predetermined range.

D. Example of Alternative Target Device

As described above, system 100 may provide sample container 110 as the target for imaging. In some other instances, it may be desirable to provide a target device, in place of sample container 100, with the target device being dedicated to calibration and quality control checking purposes. Such a dedicated target device may be sized and configured to fit within system 100 in place of sample container 110, such that the dedicated target device may have a thickness and imaging surface similar to that provided by sample container. The dedicated target device may further include one or more optical patterns on the image target surface. In the context of a SIM system, it may be necessary to take special care in how those optical patterns are defined. Optical patterns that may be suitable for a dedicated target device as used in a non-SIM system may not be suitable for use in a SIM system. For instance, an optical pattern that uses an array of straight lines that are parallel with each other and are consistently apart from each other, an array of dots aligned in a perfect grid, or some other pattern with regularly repeating elements may not provide desired Moire aliasing effects in a SIM system. In other words, such patterns may not allow structurally illuminated fringe frequency peaks to be discerned from artifact frequency peaks of the target pattern.

In view of the foregoing, it may be desirable to provide randomization within an optical pattern in a target device that is dedicated for use in a SIM system. This may include a pattern of dots, lines, or other features that are arranged in a random, non-ordered fashion. In some instances, the optical pattern may be pseudo-randomized. An example of such pseudo-randomization is shown in FIGS. 9A and 9B. In FIG. 9A, a set of dots are shown in an ordered arrangement, such that the dots are equidistantly spaced apart from each other. This configuration of FIG. 9A may be suitable for use in a target device for a non-SIM system but not a target device for a SIM system. To provide pseudo-randomization, a target design may begin with an ordered array dots and then move each of the dots in a randomized fashion to reach a pattern like the one shown in FIG. 9B. With the dots in a pseudo-randomized pattern as shown in FIG. 9B, the configuration may be suitable for use in a target device for a SIM system.

In the example described above with reference to FIGS. 9A and 9B, the pattern of FIG. 9B is "pseudo-randomized" rather than being "randomized" since the pattern was initially provided in an ordered arrangement. This "pseudo-randomization" may be preferable over "pure randomization" because the randomizing process (i.e., converting the pattern of FIG. 9A to a pattern like the one shown in FIG. 9B) may allow the provision of a certain minimum amount of spacing between the dots in the "pseudo-randomized" pattern. In other words, pseudo-randomization process may ensure that the dots in the pattern are at least a certain distance apart from each other. This may be important in SIM imaging, as the SIM imaging results may be unacceptable or otherwise less than ideal if dots in the target optical pattern are too close to each other. The pseudo-randomization may otherwise allow the repositioning of the dots from the ordered array of FIG. 9A to be purely random, aside from enforcing the minimum dot spacing rule.

Figure 11A:
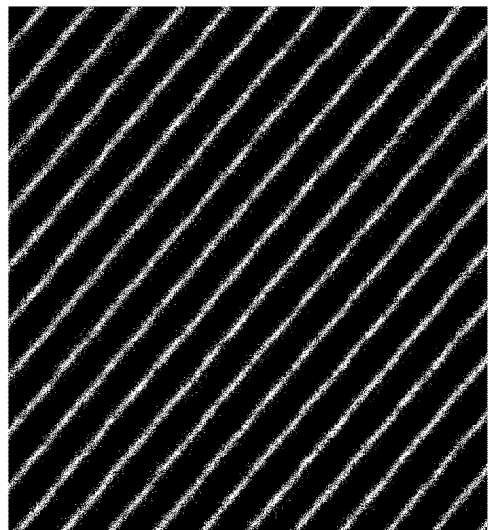
FIG. 11A depicts an example of an intensity profile for an on-angle structured illumination pattern.
Figure 11B:
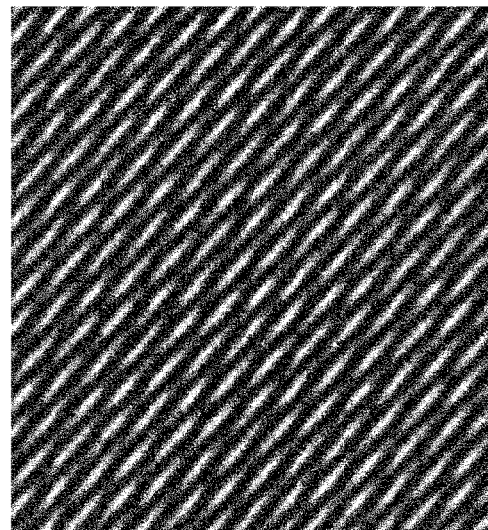
FIG. 11B depicts an example of an intensity profile for an off-angle structured illumination pattern.

A dedicated target device for calibrating and quality control checking in a SIM system may include other optical features, in addition to or in lieu of including a pattern of dots as described above. For instance, a target device may include a patterned line array. Such a line array may include line pairs. Each line pair may be angled at required/expected angles of the structured illumination. Thus, when the patterned light is shifted in and out of phase of the line pairs, differences in resultant intensity (as a result of the ranging constructive/in-phase and destructive/opposite-phase interference) may enable measurement of the level of parallelism between the two patterns. As shown in FIG. 10, as the structured illumination (b/d) is shifted in (b) and out (d) of phase with the line pairs (a) this will resultant in more (c) or less (e) measured intensity from the constructive and destructive interference, respectively. If the two patterns, the printed line pairs and the structured illumination, are perfectly parallel/on-angle, the resultant intensity profile may be expected to provide uniformly angled lines such as those shown in FIG. 11A. However, if the structured illuminated pattern is off-angle, the resultant intensity signature may reveal cyclical dark portions, such as those shown in FIG. 11B, depending on the degree of off-axis angle.

It may also be desirable for a dedicated target device to include a fluid channel containing fluid that fluoresces in response to light from optical system 200. To the extent that a sample container 110 may also contain fluid channels (e.g., as part of a flow cell), some such fluid channels may be relatively thick. Relatively thick fluid channels may be less conducive to SIM imaging, as less modulation may be measured of the reimaged fringes.

Figure 12:
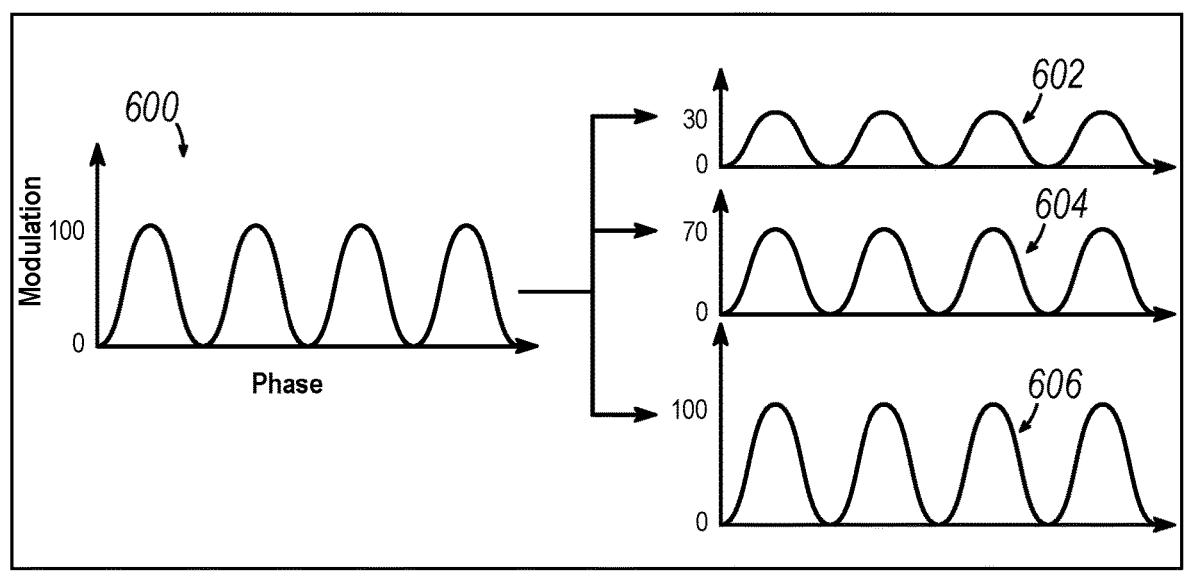
FIG. 12 depicts reimaged modulation signals through SIM imaging of fluid channels of varying thickness.

FIG. 12 shows examples of different modulation plots based on the depth of the fluid channel. Plot 600 shows the input signal in the form of modulation as a function of phase. Plot 602 shows an example of the signal from a relatively thick fluid channel (e.g., approximately 75 µm thick), representing modulation of the reimaged fringes. As shown, the reimaged modulation with the relatively thick fluid channel is substantially smaller than the input modulation. Plot 604 shows an example of the signal from a relatively thin fluid channel (e.g., approximately 3 µm thick), representing modulation of the reimaged fringes. As shown, the reimaged modulation with the relatively thin fluid channel is substantially closer to the input modulation than the reimaged modulation with the relatively thick fluid channel. By way of example only, the reimaged modulation with the relatively thick fluid channel may be approximately 30% of the input modulation; while the reimaged modulation of the relatively thin channel may be approximately 70% of the input modulation. Plot 606 shows an example of the signal from an even thinner fluid channel (e.g., arbitrarily thinner than 3 µm), representing modulation of the reimaged fringes.

As may be seen by comparing these plots 600, 602, 604, 606, the reimaged modulation gets closer to the input modulation the thinner the fluid channel is. The reimaged modulation approaches the input modulation as the thickness of the fluid channel approaches 0 µm. This may encourage design of a fluid channel that is as thin as is manufacturable. However, making the fluid channel too thin may adversely impact the photostability of dye in the fluid channel. It may therefore be desirable to strike an appropriate balance between photostability of dye in the fluid channel and accuracy of the reimaged modulation. By way of example only, the appropriate balance may be found with a fluid channel thickness of approximately 3 µm. Alternatively, an acceptable balance may be found with a fluid channel thickness from approximately 2 µm to approximately 10 µm.

V. Miscellaneous

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Some versions of the examples described herein may be implemented using a computer system, which may include at least one processor that communicates with a number of peripheral devices via bus subsystem. These peripheral devices may include a storage subsystem including, for example, memory devices and a file storage subsystem, user interface input devices, user interface output devices, and a network interface subsystem. The input and output devices may allow user interaction with the computer system. The network interface subsystem may provide an interface to outside networks, including an interface to corresponding interface devices in other computer systems. User interface input devices may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system to the user or to another machine or computer system.

A storage subsystem may store programming and data constructs that provide the functionality of some or all of the modules and methods described herein. These software modules may be generally executed by the processor of the computer system alone or in combination with other processors. Memory used in the storage subsystem may include a number of memories including a main random access memory (RAM) for storage of instructions and data during program execution and a read only memory (ROM) in which fixed instructions are stored. A file storage subsystem may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor.

The computer system itself may be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the example of the computer system described herein is intended only as a specific example for purposes of illustrating the technology disclosed. Many other configurations of a computer system are possible having more or less components than the computer system described herein.

As an article of manufacture, rather than a method, a non-transitory computer readable medium (CRM) may be loaded with program instructions executable by a processor. The program instructions when executed, implement one or more of the computer-implemented methods described above. Alternatively, the program instructions may be loaded on a non-transitory CRM and, when combined with appropriate hardware, become a component of one or more of the computer-implemented systems that practice the methods disclosed.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A method including:
receiving a plurality of image sets, each image set of the plurality of image sets including images captured using structured illumination microscopy (SIM) in an optical system;
isolating a first image set from the plurality of image sets;
measuring a full width at half maximum (FWHM) value corresponding to each image in the first image set;
performing parameter estimation based at least in part on the measured FWHM value corresponding to each image the first image set;
identifying in-focus parameters based at least in part on the performed parameter estimation corresponding to the first image set;
calculating a co-focus metric for the image sets; and
generating a report presenting parameter values corresponding to the optical system, based at least in part on the calculated co-focus metrics.

2. The method of claim 1, further comprising generating parameters associated with each image, the generated parameters being selected from a group consisting of a z-height, a channel, an angle index, a modulation value, a grating spacing, a grating angle, and combinations thereof.

3. The method of claim 1, further comprising mapping angles of fringes from the optical system in the image sets.

4. The method of claim 1, further comprising mapping spacing of fringes from the optical system in the image sets.

5. The method of claim 1, further comprising mapping phase displacement of fringes from the optical system in the image sets.

6. The method of claim 1, further comprising:
identifying a minimum FWHM slice based at least in part on an average FWHM value across the images in the first image set;
the act of performing parameter estimation based at least in part on the measured FWHM value corresponding to each image the first image set comprising performing parameter estimation on the identified minimum FWHM slice corresponding to the first image set;
performing a modulation calculation based at least in part on the identified in-focus parameters corresponding to the first image set.

7. The method of claim 2, the images having been captured at different z-positions, the minimum FWHM slice being associated with a first z-position, the method further comprising identifying a second z-position associated with a maximum modulation based on the performed modulation calculation.

8. The method of claim 3, the calculating a co-focus metric for the image sets comprising subtracting a second z-position from the first z-position.

9. A method comprising:
emitting structured illumination toward a preformed optical pattern on a targeting device;
receiving a plurality of image sets, each image set of the plurality of image sets including images captured using structured illumination microscopy (SIM) in an optical system, each image set being captured at a respective z-position from the targeting device and including captured images of the preformed optical pattern, each image from each image set having an associated channel and grating angle;
measuring a full width at half maximum (FWHM) value corresponding to each image in the plurality of image sets;
predicting values of SIM parameters of each image in the plurality of image sets, the predicting being based at least in part on the measured FWHM values; and
generating reconstructed images based at least in part on the predicted values of SIM parameters.

10. The method of claim 9, the predicted values of SIM parameters including one or more of a predicted phase of a structured illumination pattern or a predicted frequency of a structured illumination pattern.

11. The method of claim 9, further comprising storing the predicted values of SIM parameters based at least in part on image capture times for the images of the plurality of images.

12. The method of claim 9, further comprising storing the predicted values of SIM parameters based at least in part on image target positions of the plurality of images.

13. The method of claim 9, the predicted values of SIM parameters being selected from a group consisting of z-position, channel, angle index, FWHM, grating spacing, grating angles, and combinations thereof.

14. The method of claim 9, further comprising:
identifying a minimum FWHM slice based at least in part on an average FWHM value across the images in a first image set from the plurality of image sets;
performing parameter estimation on the identified minimum FWHM slice corresponding to the first image set;
identifying in-focus parameters based at least in part on the performed parameter estimation corresponding to the first image set; and
performing a modulation calculation based at least in part on the identified in-focus parameters corresponding to the first image set.

15. An apparatus comprising:
a first optical assembly to emit structured illumination toward a target, the first optical assembly including:
a light emitting assembly,
a first phase mask to impart a first pattern to light emitted by the light emitting assembly,
a second phase mask to impart a second pattern to light emitted by the light emitting assembly, and
a phase adjustment assembly to adjust a phase of light structured by the first phase mask and the second phase mask;

a second optical assembly, the second optical assembly including an image sensor to capture images of the target as illuminated by the first optical assembly;

a targeting device including a preformed optical pattern, the targeting device to enable the first optical assembly to emit structured illumination toward the preformed optical pattern, the targeting device to enable the image sensor to capture images of the preformed optical pattern as illuminated by the first optical assembly; and a processor, the processor to perform the following:
  receive images captured using the second optical assembly,
  isolate a first image set from the plurality of images,
  measure a full width at half maximum (FWHM) value corresponding to each image in the first image set,
  perform parameter estimation based at least in part on the measured FWHM value,
  identify in-focus parameters based at least in part on the performed parameter estimation corresponding to the first image set, and
  perform a modulation calculation based at least in part on the identified in-focus parameters corresponding to the first image set.

16. The apparatus of claim 15, the preformed optical pattern including an array of dots, the dots of the array being positioned in a non-ordered arrangement, the dots of the array being spaced apart from each other by at least a predetermined minimum spacing distance.

17. The apparatus of claim 15, the preformed optical pattern including a patterned line array.

18. The apparatus of claim 17, the patterned line array including at least one line pair, the first pattern of the first phase mask including a first set of lines, the second pattern of the second phase mask including a second set of lines, the lines of the at least one line pair being arranged to be off-angle relative to the lines of the first set of lines and relative to the lines of the second set of lines.

19. The apparatus of claim 17, the patterned line array being configured to enable measurement of a level of parallelism between lines of the patterned line array and lines generated by the first optical assembly.

20. The apparatus of claim 15, the targeting device further including a fluid filled channel, the fluid filled channel containing a fluid that is to fluoresce in response to light from the first optical assembly, the fluid filled channel having a depth from approximately 2 µm to approximately 10 µm.

* * * * *